United States Patent
Yang

(10) Patent No.: US 10,136,349 B2
(45) Date of Patent: Nov. 20, 2018

(54) SYSTEM AND METHOD FOR CHANGING AN IDENTIFIER OF A BASIC SERVICE SET

(71) Applicant: Futurewei Technologies, Inc., Plano, TX (US)

(72) Inventor: Yunsong Yang, San Diego, CA (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 151 days.

(21) Appl. No.: 15/187,255

(22) Filed: Jun. 20, 2016

(65) Prior Publication Data

US 2017/0367129 A1    Dec. 21, 2017

(51) Int. Cl.
*H04W 24/10* (2009.01)
*H04L 29/06* (2006.01)
(Continued)

(52) U.S. Cl.
CPC .......... *H04W 24/10* (2013.01); *H04L 41/08* (2013.01); *H04L 43/10* (2013.01); *H04L 69/22* (2013.01);
(Continued)

(58) Field of Classification Search
CPC ......... H04L 47/10; H04L 47/12; H04L 47/20; H04L 47/24; H04L 47/32; H04L 47/38; H04L 47/70; H04L 47/72; H04L 47/74; H04L 47/78; H04L 47/80; H04L 47/18; H04L 47/52; H04W 28/02; H04W 28/0205; H04W 28/021
(Continued)

(56) References Cited

U.S. PATENT DOCUMENTS 9,942,193 B1 *  4/2018  Chu .................. H04L 61/2038
2007/0153732 A1  7/2007  Yao
(Continued)

FOREIGN PATENT DOCUMENTS

CN        1852193 A    10/2006
CN      102986277 A     3/2013
(Continued)

OTHER PUBLICATIONS

IEEE P802.11axTM/D0.2, "Draft Standard for Informaiton technology—Tele-communications and information exhange between systems Local and metropolitan area networks—Specific requirements, Part 11: Wireless LAN Medium Access Control (MAC) and Physical Layer (PHY) Specifications, Amendment 6: Enhancements for high efficiency in frequency bands between 1 GHz and 6 GHz", Jun. 2016, 227 pages.

*Primary Examiner* — Dady Chery
(74) *Attorney, Agent, or Firm* — Slater Matsil, LLP

(57) ABSTRACT

A method for changing an identifier of a basic service set (BSS) served by an access point (AP) includes determining a first value of the identifier of the BSS, transmitting a first physical (PHY) protocol data unit (PPDU) with a first BSS identifier field in a PHY header of the first PPDU set to a pre-specified value, transmitting at least one first management frame including a second BSS identifier field in a frame body of the at least one first management frame set to the first value, and transmit at least one second PPDU with the first BSS identifier field in the PHY header set to the first value when the AP is able to start using the first value to set the first BSS identifier field in the PHY header of PPDUs transmitted by the AP.

24 Claims, 12 Drawing Sheets

(51) Int. Cl.

| | | |
|---|---|---|
| *H04W 24/04* | (2009.01) | |
| *H04L 12/26* | (2006.01) | |
| *H04L 12/24* | (2006.01) | |
| *H04W 24/02* | (2009.01) | |
| *H04L 29/08* | (2006.01) | |
| *H04W 84/12* | (2009.01) | |
| *H04W 8/26* | (2009.01) | |
| *H04W 84/00* | (2009.01) | |

(52) U.S. Cl.
CPC .......... *H04L 69/323* (2013.01); *H04W 24/02* (2013.01); *H04W 24/04* (2013.01); *H04L 69/321* (2013.01); *H04W 8/26* (2013.01); *H04W 84/005* (2013.01); *H04W 84/12* (2013.01)

(58) Field of Classification Search
USPC .......................................... 370/230–235, 341
See application file for complete search history.

(56) References Cited

U.S. PATENT DOCUMENTS

2011/0280229 A1 11/2011 Montemurro et al.
2015/0110093 A1* 4/2015 Asterjadhi .......... H04W 74/008
 370/338

FOREIGN PATENT DOCUMENTS

| CN | 105684541 A | 6/2016 |
|---|---|---|
| WO | 2012045043 A2 | 4/2012 |

\* cited by examiner

SYSTEM AND METHOD FOR CHANGING AN IDENTIFIER OF A BASIC SERVICE SET

TECHNICAL FIELD

The present invention relates generally to a system and method for digital communications, and, in particular embodiments, to a system and method for changing an identifier of a basic service set (BSS).

BACKGROUND

The Institute of Electrical and Electronics Engineers (IEEE) Standard 802.11 is a set of physical (PHY) layer and media access control (MAC) layer specifications for implementing wireless fidelity (Wi-Fi) communications in the 2.4 GHz, 5 GHz, and 60 GHz frequency bands. A basic service set (BSS) provides the basic building-block of an 802.11 communications system. In an infrastructure mode of 802.11, an access point (AP) and one or more associated stations (STAs) may form a BSS. An AP may also be commonly referred to as an access controller, a base station, a NodeB, an evolved NodeB (eNB), a network controller, and the like. A station (STA) may also be commonly referred to as a device, a user equipment (UE), a mobile station, a mobile, a user, a subscriber, a terminal, a communications device, and the like. The simplest infrastructure BSS consists of one AP and one station.

A Task Group ax (TGax) has been formed in IEEE 802.11 to develop a technical specification for, among other things, improving system efficiency and area throughput, and improving real world performance in indoor and outdoor deployments in the presence of high density of APs and stations.

SUMMARY

Example embodiments provide a system and method for changing an identifier of a basic service set (BSS).

In accordance with an example embodiment, a method for changing an identifier of a basic service set (BSS) served by an access point (AP) is provided. The method includes determining, by the AP, a first value of the identifier of the BSS, transmitting, by the AP, a first physical (PHY) protocol data unit (PPDU) with a first BSS identifier field in a PHY header of the first PPDU set to a pre-specified value, transmitting, by the AP, at least one first management frame including a second BSS identifier field in a frame body of the at least one first management frame set to the first value, and transmitting, by the AP, at least one second PPDU with the first BSS identifier field in the PHY header of the at least one second PPDU set to the first value.

In accordance with an example embodiment, a method for changing an identifier of a BSS including a station is provided. The method includes receiving, by the station, a first PPDU from an AP serving the BSS, the first PPDU including a PHY header with a first BSS identifier field set to a pre-specified value, receiving, by the station, a management frame from the AP, the management frame including a second BSS identifier field in a frame body of the management frame, the second BSS identifier field set to a first value of the identifier of the BSS, and transmitting, by the station, a second PPDU including a PHY header with the first BSS identifier field in the PHY header of the second PPDU set to the first value.

In accordance with an example embodiment, an AP adapted to change an identifier of a BSS served by the AP is provided. The AP includes a processor, and a computer readable storage medium storing programming for execution by the processor. The programming including instructions to configure the AP to determine a first value of the identifier of the BSS, transmit a first PPDU with a first BSS identifier field in a PHY header of the first PPDU set to a pre-specified value, transmit at least one first management frame including a second BSS identifier field in a frame body of the at least one first management frame set to the first value, and transmit at least one second PPDU with the first BSS identifier field in the PHY header set to the first value.

In accordance with an example embodiment, a station adapted to change an identifier of a BSS including the station is provided. The station includes a processor, and a computer readable storage medium storing programming for execution by the processor. The programming including instructions to configure the station to receive a first PPDU from an AP serving the BSS, the first PPDU including a PHY header with a first BSS identifier field set to a pre-specified value, receive a management frame from the AP, the management frame including a second BSS identifier field in a frame body of the management frame, the second BSS identifier field set to a first value of the identifier of the BSS, and transmit a second PPDU including a PHY header with the first BSS identifier field in the PHY header of the second PPDU set to the first value.

In accordance with an example embodiment, a non-transitory computer-readable medium storing programming for execution by a processor, the programming including instructions to determine a first value of the identifier of the BSS, transmit a first PPDU with a first BSS identifier field in a PHY header of the first PPDU set to a pre-specified value, transmit at least one first management frame including a second BSS identifier field in a frame body of the at least one first management frame set to the first value, and transmit at least one second PPDU with the first BSS identifier field in the PHY header set to the first value when the AP is able to start using the first value to set the first BSS identifier field in the PHY header of PPDUs transmitted by the AP.

In accordance with an example embodiment, a non-transitory computer-readable medium storing programming for execution by a processor, the programming including instructions to receive a first PPDU from an AP serving the BSS, the first PPDU including a PHY header with a first BSS identifier field set to a pre-specified value, receive a management frame from the AP, the management frame including a second BSS identifier field in a frame body of the management frame, the second BSS identifier field set to a first value of the identifier of the BSS, and transmit a second PPDU including a PHY header with the first BSS identifier field in the PHY header of the second PPDU set to the first value.

In accordance with an example embodiment, a method for managing an identifier of a BSS served by an AP is provided. The method includes detecting, by the AP, a departure of the AP from a first location, changing, by the AP, the identifier of the BSS from a first non-transitory value to a second non-transitory value, wherein the first non-transitory value identifies the BSS, and wherein the second non-transitory value is a first pre-specified value and does not identify the BSS, detecting, by the AP, an arrival of the AP at the first location, and changing, by the AP, the identifier of the BSS from the second non-transitory value to a third non-transitory value, wherein the third non-transitory value identifies the BSS. The method also includes transmitting, by the AP, a first PPDU with a first BSS identifier field in a PHY header of the first PPDU set to a transitory value, wherein the transitory value is a second pre-specified value, and wherein the transitory value indicates a pending change in the value of the identifier of the BSS, transmitting, by the AP, at least one first management frame including a second BSS identifier field in a frame body of the at least one management frame set to the second non-transitory value, and transmitting, by the AP, at least one second PPDU with the first BSS identifier field in the PHY header of the at least one second PPDU set to the second non-transitory value. The method also includes transmitting, by the AP, a third PPDU with the first BSS identifier field in the PHY header of the third PPDU set to the transitory value, transmitting, by the AP, at least one second management frame including the second BSS identifier field in the frame body of the at least one second management frame set to the third non-transitory value, and transmitting, by the AP, at least one fourth PPDU with the first BSS identifier field in the PHY header of the at least one fourth PPDU set to the third non-transitory value.

In accordance with an example embodiment, an AP adapted to manage an identifier of a BSS served by an AP is provided. The AP includes a processor, and a computer readable storage medium storing programming for execution by the processor. The programming including instructions to configure the AP to detect a departure of the AP from a first location, change the identifier of the BSS from a first non-transitory value to a second non-transitory value, wherein the first non-transitory value identifies the BSS, and wherein the second non-transitory value is a first pre-specified value and does not identify the BSS, detect an arrival of the AP at the first location, and change the identifier of the BSS from the second non-transitory value to a third non-transitory value, wherein the third non-transitory value identifies the BSS. The programming also includes instructions to configure the AP to transmit a first PPDU with a first BSS identifier field in a PHY header of the first PPDU set to a transitory value, wherein the transitory value is a second pre-specified value, and wherein the transitory value indicates a pending change in the value of the identifier of the BSS, transmit at least one first management frame including a second BSS identifier field in a frame body of the at least one management frame set to the second non-transitory value, and transmit at least one second PPDU with the first BSS identifier field in the PHY header of the at least one second PPDU set to the second non-transitory value. The programming also includes instructions to configure the AP to transmit a third PPDU with the first BSS identifier field in the PHY header of the third PPDU set to the transitory value, transmit at least one second management frame including the second BSS identifier field in the frame body of the at least one second management frame set to the third non-transitory value, and transmit at least one fourth PPDU with the first BSS identifier field in the PHY header of the at least one fourth PPDU set to the third non-transitory value. The AP is located in a hand-held or a wearable communications device. The AP includes a sensor or a communications interface for detecting the departure or arrival of the AP.

Practice of the foregoing embodiments enables changing an identifier of a basic service set without causing the stations to pre-maturely enter a power save mode or deny themselves legitimate opportunities for spatially reusing a shared channel for transmissions.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

Figure 1:
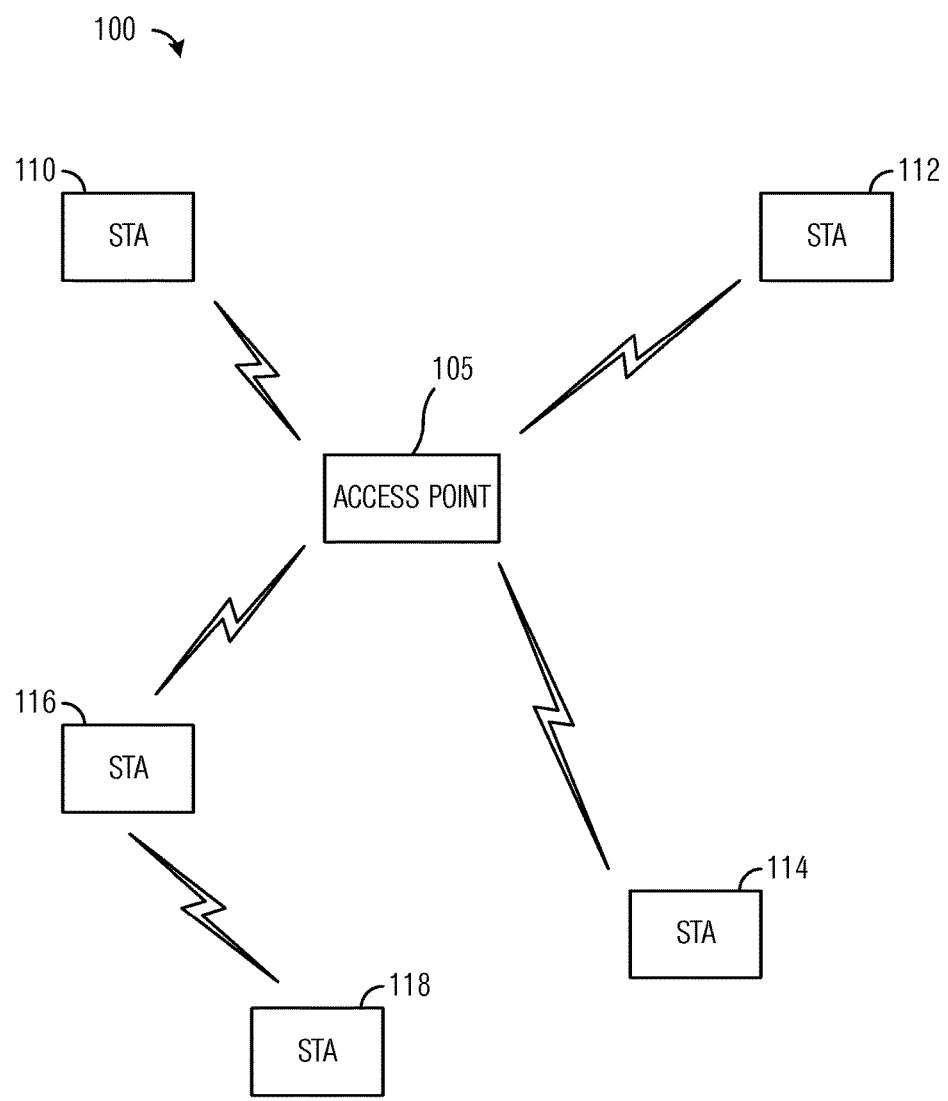
FIG. 1 is a first example communications system according to example embodiments described herein.

FIG. 1 illustrates a first example communications system 100. Communications system 100 includes an access point (AP) 105 and a plurality of stations (STAs), such as station 110, station 112, station 114, station 116, and station 118, which are served by AP 105. In order to communicate with one another, AP 105 and stations 110-118 contend for the access to a share channel using a distributed mechanism known as carrier sense multiple access with collision avoidance (CSMA/CA). AP 105 contends for accessing the channel in order to transmit downlink (DL) data to stations 110-118. AP 105 also controls the priorities of stations 110-118 for their accessing the channel for transmitting data to AP 105 or to one another, by assigning different access parameters to stations 110-118, such as a contention window size, a period of an inter-frame interval space that the stations need to wait after the end of a frame, etc. AP 105 is usually connected with a distribution system (DS), which provides connection with a network and various network elements, such as an authentication server for authenticating the stations, a Dynamic Host Configuration Protocol (DHCP) server for assigning IP addresses to the stations, etc. The DS, the network, and the various network elements are not shown in FIG. 1 in order to maintain simplicity. AP 105 may assign a different set of access parameters, thereby a different access priority, to itself in order to perform various control and management functions effectively.

While it is understood that communications systems may employ multiple APs capable of communicating with a number of stations, only a single AP, and five stations are illustrated in FIG. 1 for simplicity.

Figure 2A:
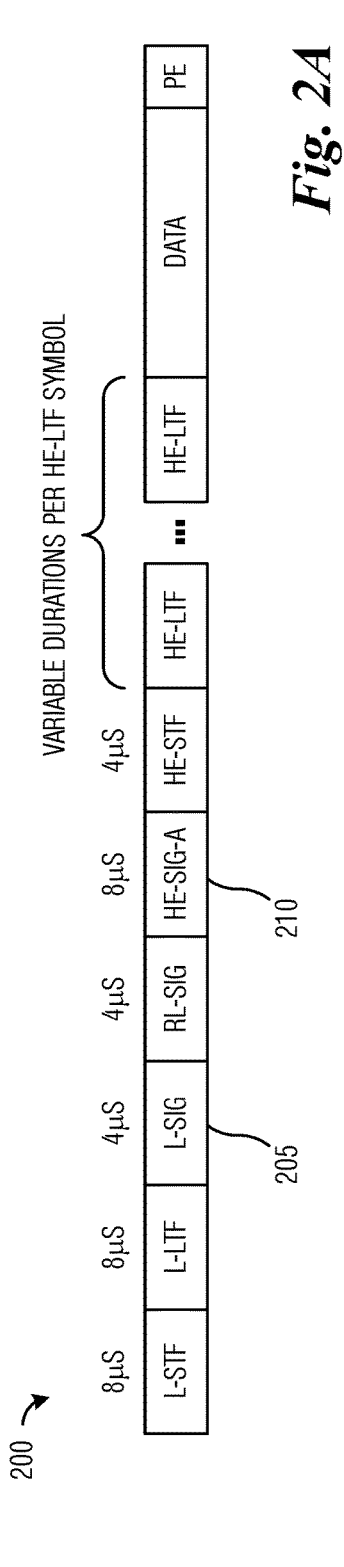
FIGS. 2A, 2B, 2C, and 2D illustrate four high efficiency (HE) physical (PHY) protocol data unit (PPDU) formats defined in the draft IEEE 802.11ax Amendment.
Figure 2B:
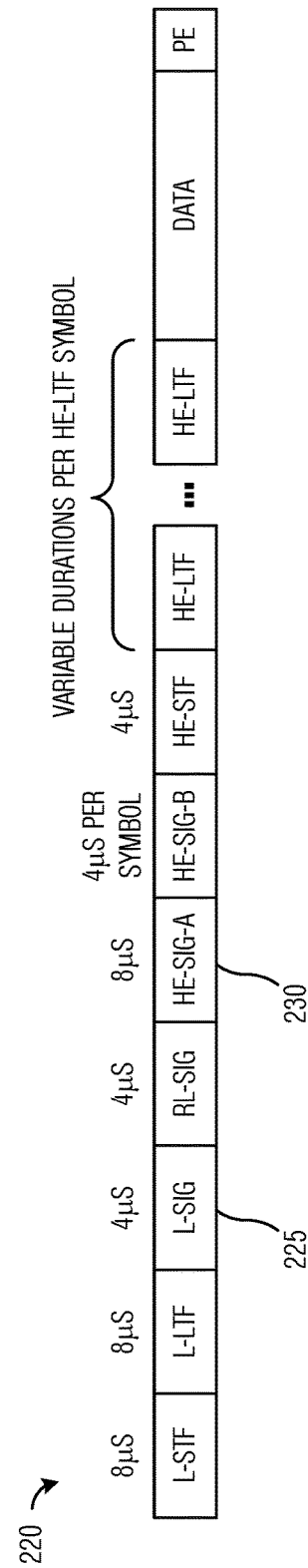
Figure 2C:
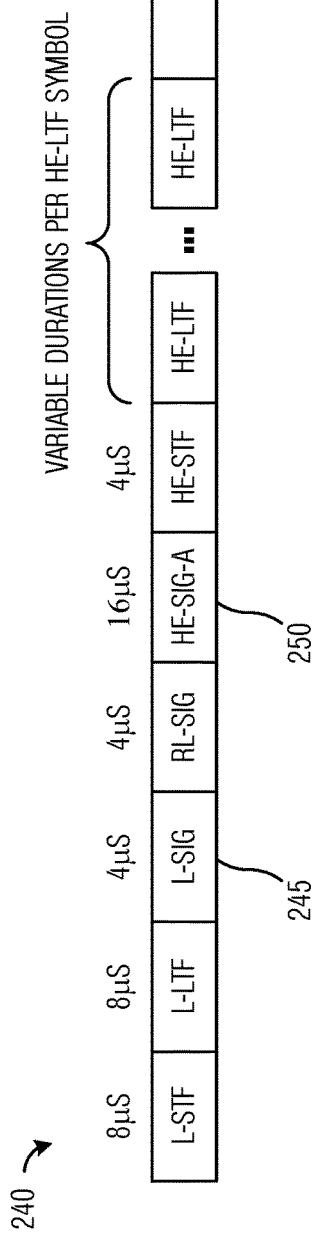
Figure 2D:
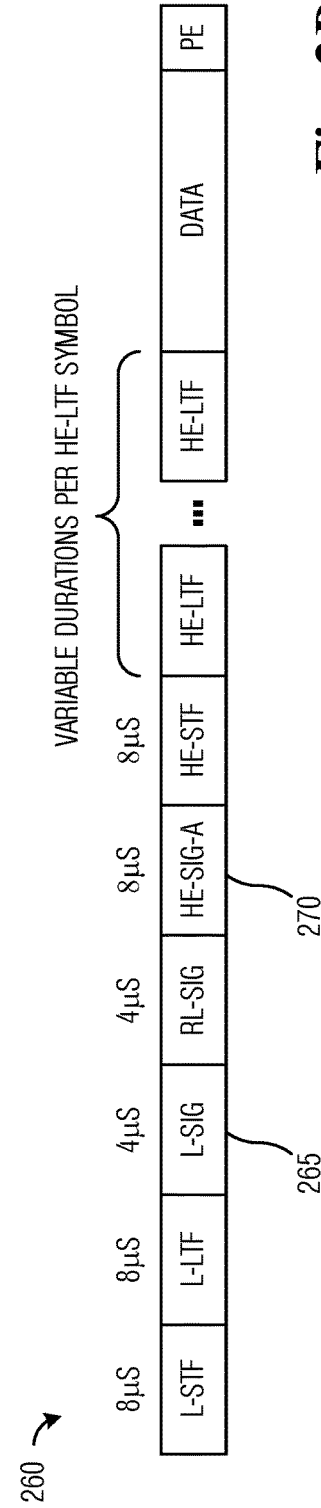

FIGS. 2A, 2B, 2C, and 2D illustrate four high efficiency (HE) physical (PHY) protocol data unit (PPDU) formats defined in the draft IEEE 802.11ax Amendment. FIG. 2A illustrates a HE single user (SU) PPDU format and FIG. 2C illustrates a HE Extended Range SU PPDU format. The HE SU PPDU format and the HE Extended Range SU PPDU format are used for a single-user transmission. FIG. 2B illustrates a HE multi-user (MU) PPDU format that is used for a MU transmission that is not a response to a Trigger frame. FIG. 2D illustrates a HE Trigger-based PPDU format that is used for a transmission that is a response to a Trigger frame. A Length subfield in a Legacy Signal (L-SIG) field (such as L-SIG field 205 in FIG. 2A, L-SIG field 225 in FIG. 2B, L-SIG field 245 in FIG. 2C, and L-SIG field 265 in FIG. 2D) of an HE PPDU indicates the HE PPDU format being used.

Each PPDU format also includes a Legacy Short Training field (L-STF), a Legacy Long Training field (L-LTF), a Repeated Legacy Signal field (RL-SIG), a HE Signal A field (HE-SIG-A), a HE Short Training field (HE-STF), and a HE Long Training field (HE-LTF). The HE MU PPDU format further includes a HE Signal B field (HE-SIG-B) containing transmission parameters that are specific for individual target stations of the multi-user transmission. The fields from L-STF to HE-LTF form the PHY header of a HE PPDU. Each PPDU format also includes a Data field (shown as "DATA") used to carry a MAC Protocol Data Unit (MPDU), and a Packet Extension (PE) field. An MPDU is a payload of a PPDU. A PPDU is also commonly referred to as a frame.

The HE-SIG-A field (such as HE-SIG-A 210 in FIG. 2A, HE-SIG-A 230 in FIG. 2B, HE-SIG-A 250 in FIG. 2C, and HE-SIG-A 270 in FIG. 2D) in an HE PPDU includes a BSS Color subfield, which contains a 6-bit identifier of the BSS (referred to as a BSS Color) that the transmitting station or AP belongs to. The BSS Color value that a BSS uses may be chosen by the AP serving the BSS or by a centralized entity that manages the assignment of BSS Color values for multiple APs. The BSS Color is used to assist a receiving station or AP in identifying the BSS from which the received PPDU originates so that the station may use the channel access rules for spatial reuse or may enter a doze state of a power save (PS) mode, which will be explained below. Inter-BSS means that the receiving station or AP and the transmitting station or AP belong to different BSSs. Intra-BSS means that the receiving station or AP and the transmitting station or AP belong to the same BSS.

BSS Color based clear channel assessment (CCA) rules for spatial reuse are as follows:

The station processes a PHY header of a received HE PPDU to determine a total duration (and thereby a remaining duration after the PHY header) of the received HE PPDU (e.g., with a value in a duration or length field in the PHY header) and the station also determines if the received HE PPDU is an inter-BSS or intra-BSS PPDU by using the BSS Color value included in the HE-SIG-A field in the received PPDU.

If the station determines that the received PPDU is intra-BSS, the station compares a received signal power (or strength) to a minimum receiver sensitivity level to determine if the channel is idle or not.

If the station determines that the received PPDU is inter-BSS, the station compares the received signal power (or strength) to an idle threshold (such as an overlapping BSS (OBSS) power detection (OBSS_PD) level) to determine if the channel is idle or not, wherein the OBDD_PD level has a nominal value greater than that of the minimum receiver sensitivity level. An OBSS refers to a BSS having overlapping coverage area, which includes the coverage areas of both the APs and the stations, with another BSS.

By applying these different thresholds, the station has a tendency of being conservative (i.e., less likely to perform) in spatial reuse during a remaining time of an intra-BSS PPDU and being aggressive (i.e., more likely to perform) in spatial reuse during a remaining time of an inter-BSS PPDU. For example, if the station receives a valid PHY header of an HE PPDU, determines that the PPDU is an inter-BSS PPDU based on the BSS Color value included in the HE-SIG-A field, and determines that the received signal power (e.g., over the PHY header portion) is below the idle threshold (e.g., the OBSS_PD level) but above the minimum receiver sensitivity level, the station doesn't update its NAV (meaning that the station treats the PPDU as if the PPDU hasn't been received), thereby giving itself a chance of spatially reusing the shared channel for a transmission during a remaining time of the PPDU (after the PHY header), if other conditions are also met. Had the PPDU being considered as an intra-BSS PPDU, the station would update its NAV with a value of the duration of the PPDU because the received signal power is above the minimal receiver sensitivity level, and the updated NAV would indicate a busy channel for the remaining time of the PPDU, thereby denying the station a chance of spatially reusing the shared channel for a transmission during the entire PPDU.

Intra-PPDU PS is a power saving feature as follows: A station in an awake state and having dot11IntraPPDUPowerSaveOptionActivated equal to true operates in intra-PPDU power save mode. A station that is in intra-PPDU PS mode may enter a doze state until the end of a received PPDU, wherein a receiving unit and a processing unit of the station are unable to further receive or process a remaining part of the PPDU after receiving and processing the PHY header of the PPDU, when one of the following conditions is met:

Condition #1. The frame is an HE MU PPDU, HE SU PPDU, or HE Extended Range SU PPDU and the BSS Color included in the HE-SIG-A field of the frame equals to the BSS Color of the BSS with which the station is associated and a UL_FLAG subfield in the HE-SIG-A field indicates that the frame is a UL frame;

Condition #2. The frame is an HE MU PPDU and the BSS Color in the HE-SIG-A field of the frame equals to the BSS Color of the BSS with which the station is associated, and the UL_FLAG subfield indicates that the frame is a DL frame, and the HE-SIG-B field of the frame doesn't contain the identifier of the station or the broadcast identifier(s) intended for the station; or Condition #3. The frame is an HE Trigger-based PPDU and the BSS Color in the HE-SIG-A field of the frame equals to the BSS Color of the BSS with which the station is associated.

The BSS with which the station is associated may also be referred to as the BSS that the station belongs to.

It is noted that, besides using the BSS Color value included in the HE-SIG-A field of a received PPDU, a station or AP may also use the MAC address included in the MAC header (more specifically, in the transmitter address (TA) field (also commonly referred to as Address 2 field) when the received PPDU is a DL PPDU, or in the receiver address (RA) field (also commonly referred to as Address 1 field) when the received PPDU is an uplink (UL) PPDU) of the MPDU to identify the BSS that the transmitting station or AP belongs to. However, because a frame check sum (FCS) of an MPDU is computed over the MAC header and the MAC payload, and the FCS is placed at the end of the MPDU, the station or AP needs to decode the entire MPDU and verify the FCS in order to reliably use the MAC address whenever determining the BSS, by which time the entire PPDU has passed and the station has lost the opportunity for spatial reuse or power saving during a remaining time of the PPDU. The following discussion examines these two potential benefits, when the station is able to determine if a received PPDU is an inter-BSS PPDU or an intra-BSS PPDU based on the BSS Color value included in the PHY header (more specifically, the BSS Color subfield in the HE-SIG-A field) of the received PPDU without having to decode the PPDU payload.

In order to realize the benefits of intra-PPDU power save or spatial reuse, the station relies on the BSS Color value included in the HE-SIG-A field of a received HE PPDU to determine if the PPDU is an inter-BSS or intra-BSS PPDU, without having to decode the MPDU of the PPDU. However, due to the finite length (6-bit, for example) of the BSS Color value, the BSS Color values used by the BSSs within an area may not always be unique. A BSS Color collision may occur when OBSSs share a same BSS Color value. For example, if all the APs in a general vicinity select their respective BSS Color values randomly and independently, then according to the Birthday Paradox, with 6 bits of BSS Color, only 10 APs are needed to have a resulting 50% probability of any 2 APs randomly selecting the same BSS Color value. 10 or more APs may be commonly encountered within a neighborhood in real world high density Wi-Fi environments, such as residential areas, enterprises, shopping malls, airports, train terminals, etc. Therefore, the chance that the BSS Color values of different APs collide is not negligible in high density environments.

Figure 3:
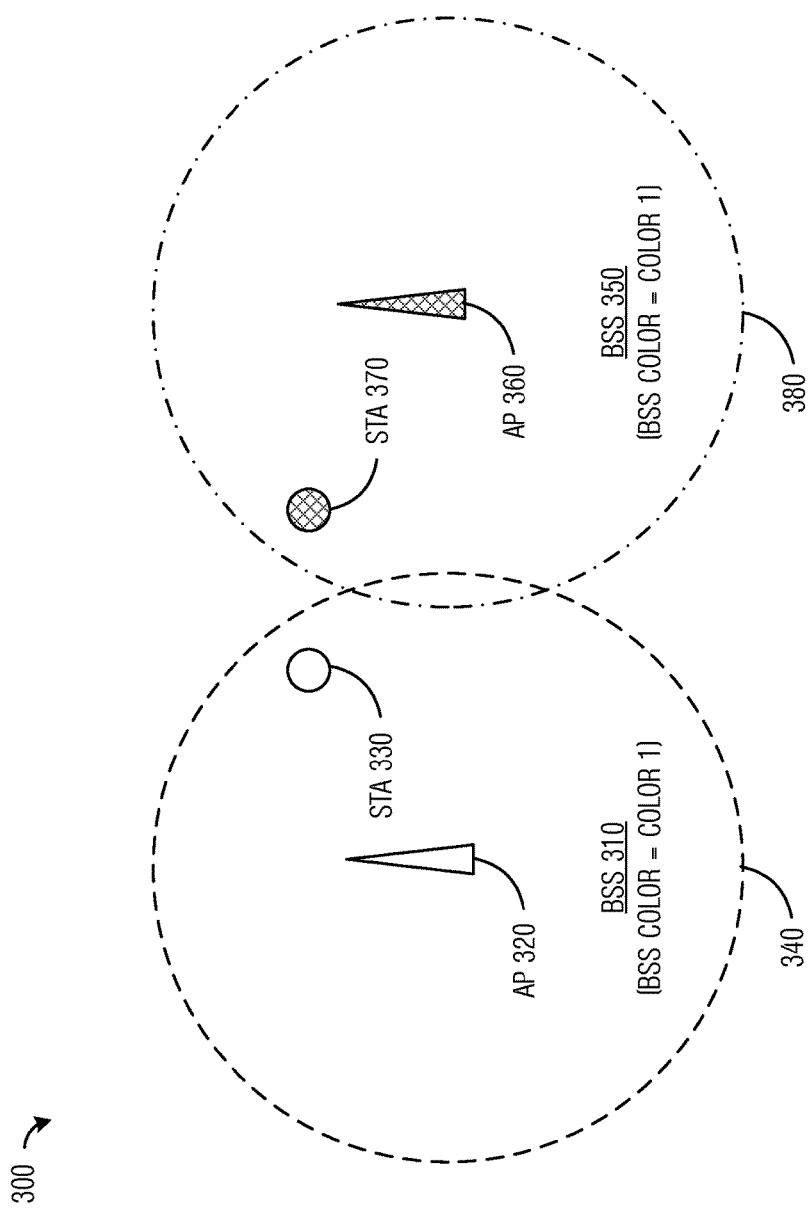
FIG. 3 illustrates an example communications system wherein identifiers (such as BSS Color values) of two OBSSs collide.

As a result of a BSS Color collision, a station may miss opportunities for spatial reuse or may enter a doze state in the intra-PPDU power save mode prematurely and subsequently miss a transmission targeted for it. FIG. 3 illustrates an example communications system wherein identifiers (such as BSS Color values) of two OBSSs collide. As shown in FIG. 3, communications system 300 includes BSS 310, which comprises AP 320 and station 330, and BSS 350, which comprises AP 360 and station 370. Station 330 and station 370 are served by AP 320 and AP 360, respectively. Although the coverage areas (shown as 340 and 380, respectively) of AP 320 and AP 360 don't significantly overlap with one another, the coverage areas of station 330 and station 370 do overlap with one another. A same BSS Color value (e.g., denoted as "Color 1") is used in both BSS 310 and BSS 350.

Without correcting the BSS Color collision, for an example, AP 360 may send a Trigger frame to trigger station 370 to transmit on the UL as a part of an UL MU transmission. Subsequently, station 370 transmits a HE Trigger-based PPDU (such as HE Trigger-based PPDU 260 in FIG. 2D) with the BSS Color subfield in the HE-SIG-A field (such as HE-SIG-A 270 in FIG. 2D) set to a value of "Color 1". AP 360 receives the UL transmission from station 370. Station 330 also receives and processes the PHY header of the HE Trigger-based PPDU transmitted by station 370. Due to the same BSS Color used in the two OBSSs, station 330 treats the received PPDU as a part of an intra-BSS UL MU transmission in which station 370 doesn't play a part (satisfying Condition #3 as described previously). Thus, station 330 may enter the doze state while station 370 transmits the remaining part of the HE-Trigger-based PPDU. Meanwhile, AP 320, being far enough away from station 370 and AP 360, considers the channel is idle and sends a data or scheduling information granting a UL transmission opportunity to station 330, which will miss the data or the UL transmission opportunity due to being in the doze state.

On the other hand, had station 330 been able to recognize the HE Trigger-based PPDU transmitted by station 370 as an inter-BSS PPDU and if the received signal power from station 370 is below the idle threshold (e.g., the OBSS_PD level), station 330 may be able to transmit data to AP 320 while station 370 transmits the remaining part of its HE Trigger-based PPDU to AP 360, thereby spatially reusing the same frequency and time resources, which is considered as an effective means to increase spectrum efficiency in a high density environment when managed carefully. However, in this example, station 330 denies itself such a chance of spatial reuse, because station 330 mischaracterized the HE Trigger-based PPDU transmitted by station 370 as an intra-BSS PPDU due to the BSS Color collision. Therefore, BSS Color collision should be avoided by all means. When a BSS Color collision does occur, a procedure is needed to allow an AP to change the BSS Color value used in the BSS that the AP serves.

It may seem straightforward that as soon as an AP detects a collision on its BSS Color value, the AP should let the BSS (including the AP itself) switch to a new BSS Color value as soon as the AP decides on and announces the use of the new BSS Color value. However, it may not be reliable or feasible to expect all associated stations to receive the first announcement regarding the new BSS Color value from the AP correctly. If the AP immediately starts to use the new BSS Color value in the BSS Color subfield in the HE-SIG-A field of the DL HE PPDUs transmitted by the AP, a station that has not received the announcement may consider the DL HE PPDUs received from the AP as inter-BSS PPDUs. As a result, one or more of the following may occur: 1) The station may discard the remaining part of the PPDU thereby miss a DL data targeted for the station; 2) The station may miss a Trigger frame that grants the station a UL transmission opportunity and, as a result, the granted UL transmission resource may be wasted; and 3) The station may try to spatially reuse the channel, during the remainder of the received DL PPDU, to transmit a PPDU, for example, which may fail and interfere with the reception of the DL PPDU by other stations. At the meantime, a station that has knowledge of and have implemented the new BSS Color value may treat a UL PPDU, which is transmitted by a station who still uses the old BSS Color, as an inter-BSS PPDU, and vice versa. As a result, the stations may try to spatially reuse the channel during the remainder of the received UL PPDU to transmit a PPDU, which may fail and interfere with the reception of the UL PPDU by the AP.

In this disclosure, systems and methods are provided to allow an AP to change a BSS Color value used in the BSS that the AP serves, e.g., when a BSS Color collision occurs, a mobility status change, and so on, so that the communications within the BSS may be carried out in a robust manner and the stations served by the AP can utilize the BSS Color value included in the HE-SIG-A field to obtain the benefits of intra-PPDU power save and spatial reuse.

According to an example embodiment, an AP initiates a BSS Color Change procedure when there is a need to change the current BSS Color value of the BSS that the AP serves. Examples of when there is a need to change the current BSS Color value include when the AP detects a BSS Color collision, when an AP changes its mobility status from moving to stationary or vice versa, and so on. Detailed discussions of some of the examples are provided below. According to an example embodiment, the BSS Color Change procedure comprises multiple stages. An example two stage BSS Color Change procedure is as follows:

During a first stage, which is also referred to as a transitory period, the AP uses a pre-specified Transitory BSS Color value to set the BSS Color subfield in the HE-SIG-A field of the DL HE PPDUs transmitted by the AP as soon as the AP determines to change the BSS Color value, e.g., after the detection of a collision with the current BSS Color value. The pre-specified Transitory BSS Color value may also be referred to as the Temporary BSS Color value or the Transient BSS Color value. An example of the pre-specified Transitory BSS Color value (e.g., through standardization or by an operator of the communications system) may be binary value "111111" (or decimal value 63) when the BSS Color is 6 bits. Another example of the pre-specified Transitory BSS Color value may be binary value "000000" (or value 0, i.e., zero). In the meantime, the AP determines a new non-transitory BSS Color value that the BSS will use and announces the new BSS Color value repeatedly using broadcast or unicast messages such as Beacon and other management frames until one or more announcement conditions are met. The AP may randomly select the new BSS Color value, obtain the new BSS Color value from a centralize entity, and so on. In situations where the AP randomly selects the new BSS Color value, the AP may make use of historical information, as well as usage information collected from transmissions of OBSSs, to help in the selection of the new BSS Color value.

The AP may periodically broadcast the latest non-transitory BSS Color value in the Beacon frames, and when BSS Color change occurs, update the latest non-transitory BSS Color with the new BSS Color value before broadcasting the next beacon frame. Examples of the announcement conditions include: a specified number of announcements have been made, an indication indicates that all the stations associated with the AP have received the new BSS Color value (e.g., from Beacon or other frames carrying such an announcement), a time T has expired, and so on. A non-transitory BSS Color value is a BSS Color value that is not the pre-specified Transitory BSS Color. For example, if the pre-specified Transitory BSS Color value is binary value "111111", a non-transitory BSS Color values may be a binary value from "000000" to "111110". For another example, if the pre-specified Transitory BSS Color value is binary value "000000", a non-transitory BSS Color values may be a binary value from "000001" to "111111". The non-transitory BSS Color value may be randomly selected by the AP. Furthermore, the AP may select a non-transitory BSS Color value that hasn't been used in another BSS. As an example, the AP may process received PPDUs and determine their respective BSS Color values, and the AP maintains information regarding the BSS Color values that are already in use. The AP may use the information regarding the BSS Color values that are already in use when selecting the non-transitory BSS Color value.

During a second stage, which is also referred to as a stable period, the AP uses the new BSS Color value to set the BSS Color subfield in the HE-SIG-A field of the DL HE PPDUs that the AP transmits after the one or more conditions, as mentioned above, are met.

Therefore, the inclusion of the Transitory BSS Color value in the HE-SIG-A field in the PHY header of a DL HE PPDU indicates that the AP transmitting the PPDU is in the process of changing its BSS Color and advises receiving STAs to further check the MAC address in the MAC header in order to determine if the PPDU is an inter-BSS or intra-BSS PPDU. On the other hand, the inclusion of a non-transitory BSS Color value in the HE-SIG-A field in the PHY header of a DL HE PPDU indicates that the AP transmitting the PPDU is in a stable period and the STAs may determine if the PPDU is an inter-BSS or intra-BSS PPDU by comparing the non-transitory BSS Color value received with the non-transitory BSS Color value that the STA knows or stores. It should be noted that after a station receives the announcement of a new BSS Color from its AP, at least for the first time when the station receives a DL HE PPDU with the BSS Color subfield in the HE-SIG-A field set to the new BSS Color value, the station should check the MAC address in the MAC header of the MPDU to verify that the PPDU indeed comes from its AP.

Figure 4:
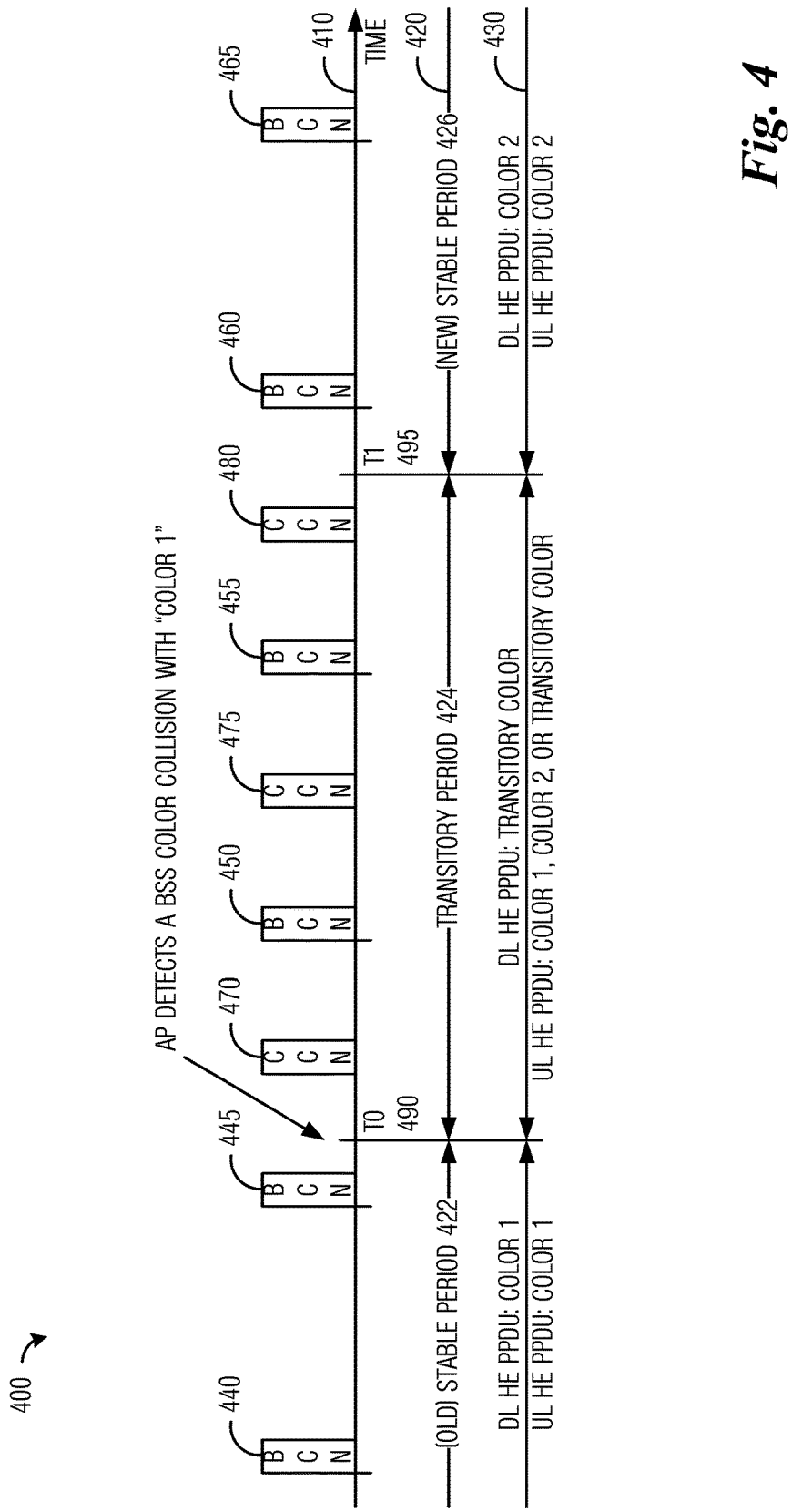
FIG. 4 illustrates a timeline wherein a BSS Color value of a BSS is changed through a transitory period according to example embodiments presented herein.

FIG. 4 illustrates a timeline wherein a BSS Color value of a BSS is changed through a transitory period according to example embodiments presented herein. As shown in FIG. 4, a first trace 410 represents the management frames transmitted by an AP for managing the BSS Color value used in a BSS served by the AP, a second trace 420 represents different periods or phases that the BSS goes through while changing the BSS Color, and a third trace 430 indicates the BSS Color value included in the PHY header (more specifically, the BSS Color subfield of the HE-SIG-A field of the PHY header) of the DL HE PPDUs and the UL HE PPDUs that are transmitted during the corresponding periods as shown on trace 420. In the particular example as shown in FIG. 4, the BSS initially is in a stable period 422 (shown as "(old) Stable Period" on trace 420) and uses a BSS Color value of "Color 1" (shown as "DL HE PPDU: Color 1" and "UL HE PPDU: Color 1" on trace 430). So, "Color 1" is included in the BSS Color subfield in the HE-SIG-A field of the DL HE PPDUs and UL HE PPDUs that are transmitted during stable period 422 until time To 490. The AP also periodically announces "Color 1" as the latest BSS Color value of the BSS during stable period 422 using Beacon (BCN) frames (such as BCNs 440 and 445).

As shown in FIG. 4, the AP detects a collision with its BSS Color value of "Color 1" at time To 490 and thereafter enters a transitory period 424 (shown as "Transitory Period" on trace 420) by immediately starting to use the pre-specified Transitory BSS Color value (such as binary value "111111", for example) to set the BSS Color subfield in the HE-SIG-A field of all DL HE PPDUs transmitted by the AP (shown as "DL HE PPDU: Transitory Color" on trace 430).

At the same time, the AP determines a new non-transitory BSS Color value (shown as "Color 2" in FIG. 4) that its BSS will use. As an illustrative example, the AP may select the new non-transitory BSS Color value by itself, with or without information (such as historical information or usage information) to assist in the selection of the new non-transitory BSS Color value. Alternatively, the AP may query a centralized entity, which manages the assignment of the BSS Color values among multiple BSSs, in order to determine the new non-transitory BSS Color value. Then, the AP may transmit a management frame as soon as possible to announce the new BSS Color value (i.e., the new non-transitory BSS Color value) to the stations within the BSS. An example of the management frame may include a Beacon (BCN) frame (such as BCN 450) and/or a Color Change Notification (CCN) frame (such as CCN 470). The AP may subsequently announce the new BSS Color value as the latest BSS Color value for a number of times using additional management frames, such as Beacon frames (such as BCN 455) and/or CCN frames (such CCN 475 and CCN 480), to ensure that all of its associated stations correctly receive the announcement. When the AP determines the new non-transitory BSS Color value, the AP simply updates its latest BSS Color value with the newly determined BSS Color value (such as value of "Color 2") and then uses the (updated) latest BSS Color value in the management frames (such as BCNs 450, 455 or CCNs 475, 480) that the AP transmits, until the next BSS Color change occurs.

A transitory period is defined as a period spanning the time between when the AP starts to use the pre-specified Transitory BSS Color value to set the BSS Color subfield in the HE-SIG-A field of the DL HE PPDUs transmitted by the AP until the time when the AP starts to use a new non-transitory BSS Color value to set the BSS Color subfield in the HE-SIG-A field of the DL HE PPDUs transmitted by the AP. The AP may decide to start using the new BSS Color value when the AP has made announcements of the new BSS Color value a specified number of times, when the AP has knowledge that the stations in the BSS have received the announcements of the new BSS Color value, or when a specified amount of time has elapsed since the AP selected the new non-transitory BSS Color value. As shown in FIG. 4, at time T1 495, transitory period 424 ends (when all associated stations of the BSS are using the new BSS Color value, for example) and the AP enters a stable period 426 (shown as "(new) Stable Period" on trace 430). The AP may continue to periodically announce the latest BSS Color value (such as "Color 2") during stable period 426) using management frames, such as BCNs 460 and 465.

For the purpose of power saving, a station may discontinue the receiving or processing of the MPDU in a DL HE PPDU after the station receives and processes the PHY header of the DL HE PPDU and determines that certain conditions are met, for example, the PPDU is an inter-BSS PPDU and the station has no data to send (i.e., no need to perform spatial reuse), or for another example, the PPDU is an intra-BSS PPDU in which the station plays no part. However, according to an example embodiment, a station always further receives and processes the MPDU in a received DL HE PPDU with the BSS Color subfield in the HE-SIG-A field set to the Transitory BSS Color value, the station needs to compare the MAC address of its associated AP with the MAC address contained in the TA field of the MAC header of the MPDU, in order to determine if the DL HE PPDU is an inter-BSS or intra-BSS PPDU. So, a station will not perform intra-PPDU power save nor spatial reuse during a remainder of a DL HE PPDU with the Transitory BSS Color value in the BSS Color subfield in the PHY header. If the MAC address contained in the TA field is equal to the MAC address of its associated AP, the station treats the DL HE PPDU as an intra-BSS PPDU and knows that its associated AP has entered a transitory period (due to use of the Transitory BSS Color value). If the MAC address contained in the TA field is not the MAC address of its associated AP or if the MPDU can't be decoded correctly (e.g., the FCS of the MPDU doesn't check), the station treats the DL HE PPDU as an inter-BSS PPDU.

During the transitory period, if a station receives the new BSS Color value from its associated AP, e.g., from a frame announcing the new BSS Color value, the station updates its record of the latest BSS Color value of its associated AP with the new BSS Color value received, so that after the update, the latest BSS Color value of its AP (as the station knows or stores) is the new BSS Color value received. The station needs to detect when its AP starts to use the new BSS Color value to set the BSS Color subfield in the HE-SIG-A field of the DL HE PPDUs that the AP transmits. Therefore, the station also starts to further receive and process the MPDU in a DL HE PPDU after processing the PHY header and detecting the new BSS Color value (as the STA knows or stores) in the BSS Color subfield in the HE-SIG-A field of the DL HE PPDU.

The further processing may include determining if the MPDU (thus the PPDU carrying the MPDU) is from the AP that the station associates with, e.g. by comparing the value in the TA field in the MAC header of the MPDU with the MAC address of the AP. If the two are equal, the station knows that its AP has switched to the new BSS Color value on the DL HE PPDUs and the transitory period has ended, after which time (time T1 495, for example), the station may start to treat DL HE PPDUs received with the new BSS Color value (which is the latest BSS Color value that the station knows or stores) in the BSS Color subfield in the PHY header of the DL HE PPDU as intra-BSS without having to check the MAC address in the MAC header.

According to an example embodiment, a station always sets the BSS Color subfield in the PHY header of the HE SU PPDUs and HE Extended Range SU PPDUs transmitted by the station to the latest BSS Color value that the station knows or stores, e.g., as received in the latest Beacon or other management frames such as CCN frames and thereby updated. Therefore, the station switches the BSS Color value used to set the BSS Color subfield in the PHY header of the HE SU PPDUs and HE Extended Range SU PPDUs transmitted by the station from an old BSS Color value to a new BSS Color value as soon as the station receives a management frame announcing the new BSS Color value from its AP. The switch to the new BSS Color value in the UL HE SU PPDUs and HE Extended Range SU PPDUs transmitted by the station serves as an acknowledgement to the AP that the station has received the announcement from the AP. For example, if a station receives CCN 470 (as shown in FIG. 4) correctly, it knows that the new BSS Color value is "Color 2". Then, the station starts to use value "Color 2" to set the BSS Color subfield in the PHY header of the HE SU PPDUs and the HE Extended Range SU PPDUs transmitted by the station. This is shown as the "Color 2" part in "UL HE PPDU: Color 1, Color 2, or Transitory Color" on trace 430 during transitory period 424 in FIG. 4.

When the AP notes that a station has switched to the new BSS Color value (such as "Color 2"), the AP knows that the station has received the announcement. On the other hand, a station that has not received the announcement continues to use the old BSS Color value (such as "Color 1") to set the BSS Color subfield in the PHY header of the HE SU PPDUs and the HE Extended Range SU PPDUs transmitted by the station. This is shown as the "Color 1" part in "UL HE PPDU: Color 1, Color 2, or Transitory Color" on trace 430 during transitory period 424 in FIG. 4. When the AP notes that a station is still using the old BSS Color (such as "Color 1"), the AP knows that the station has not received the announcement.

According to an alternative example embodiment, when a station sees that its AP is starting to use the Transitory BSS Color value to set the BSS Color subfield in the PHY header of the DL HE PPDUs transmitted by the AP, the station also starts to use the Transitory BSS Color value to set the BSS Color subfield in the PHY header of the HE SU PPDUs and HE Extended Range SU PPDUs transmitted by the station. However, the use of the Transitory BSS Color value on the UL does not serve as a reliable indication that the transmitting station has received the new BSS Color value because the use of the Transitory BSS Color value only indicates that the transmitting station has received at least one transmission from the AP with the Transitory BSS Color value. Therefore, the AP may need to rely on other criteria to determine when to end the transitory period, such as having announced the new BSS Color value for a specific number of times, etc. Thus, when compared to this alternative example embodiment, it is advantageous and a preferred mode that a station always sets the BSS Color subfield in the PHY header of the HE SU PPDUs and HE Extended Range SU PPDUs transmitted by the station to the latest BSS Color value that the station knows or stores, e.g., as received in the latest Beacon or other management frames such as CCN frames and thereby updated, because the BSS Color value used by the station in the PHY header on the UL PPDUs can serve as an explicit indication of whether the station has received the new BSS Color value from the AP.

When a station transmits on the UL as a part of a MU transmission, i.e., when the station transmits using the HE MU PPDU or the HE Triggered-based PPDU format, because the values in the HE-SIG-A fields must be the same for all the stations participating the UL MU transmission, the BSS Color value contained in the BSS Color subfield in the HE-SIG-A field should be the same among all the stations participating the UL MU transmission. In one example embodiment, all the stations participating in the same UL MU transmission copy the BSS Color value from a reference source. For example, the reference source may be the BSS Color value contained in the BSS Color subfield in the HE-SIG-A field (or a field within the PHY header or the MPDU wherein the field explicitly indicates the BSS Color value to be used on the UL MU transmission) of the DL HE PPDU that triggers the UL MU transmission or provides the UL scheduling information for the UL MU transmission. Examples of such DL HE PPDUs include a Trigger frame that triggers the UL MU transmission and a DL data frame (in an HE PPDU format) that piggy-backs the scheduling information associated with the UL MU transmission. During transitory periods, because the AP uses the pre-specified Transitory BSS Color value to set the BSS Color subfield in the PHY header of the DL HE PPDUs that the AP transmits, all the stations participating the same UL MU transmission will use the Transitory BSS Color value (by copying the same) to set the BSS Color subfield in the PHY headers of HE MU PPDUs or the HE Triggered-based PPDUs that they transmit. This is shown as the "Transitory Color" part in "UL HE PPDU: Color 1, Color 2, or Transitory Color" on trace 430 during transitory period 424 in FIG. 4.

If a station detects that its AP has entered the transitory period but the station hasn't received the announcement of the new BSS Color after a while, the station may send a query (e.g., using a management frame such as a BSS Color Request frame) to its AP to solicit the new BSS Color value. In response, the AP may send a CCN frame including the new non-transitory BSS Color value back to the requesting station in a unicast manner or to all stations in a broadcast manner.

During the transitory period, a station already knowing and implementing the BSS Color change treats received UL HE SU PPDUs and HE Extended Range SU PPDUs (i.e., PPDUs from other stations) with the new BSS Color value in the BSS Color subfield in the HE-SIG-A field in the PHY header as intra-BSS without having to check the MAC address in the MAC header. It is noted that an uplink flag (UL_FLAG) subfield within the HE-SIG-A field of an HE PPDU indicates if the HE PPDU is for UL or DL. Furthermore, when the station receives a UL HE SU PPDU or HE Extended Range SU PPDU with the old BSS Color value in the BSS Color subfield in the PHY header, the station may decide to not enter the doze state nor perform spatial reuse during the remainder of the UL PPDU. This is because the received UL PPDU with the old BSS Color value may come from an OBSS whose BSS Color value collides with the old BSS Color value of the BSS that the station belongs to. Additionally, when the station receives a UL HE MU PPDU or HE Triggered-based PPDU with the Transitory BSS Color value in the BSS Color subfield in the PHY header, the station may also decide to not enter the doze state nor perform spatial reuse during the remainder of the UL PPDU.

During the transitory period, the AP accepts the UL HE SU PPDUs and HE Extended Range SU PPDUs with either the old or the new BSS Color values in the BSS Color subfield in the PHY header, as well as the UL HE MU PPDUs and HE Trigger-based PPDUs with the Transitory BSS Color value in the BSS Color subfield in the PHY header for further processing. The AP may also accept the UL HE MU PPDUs and HE Trigger-based PPDUs with the old or the new BSS Color value in the BSS Color subfield in the PHY header for further processing as well. The AP may process an RA field in the MAC header of the MPDU of the PPDU and compare the RA value with the MAC address of the AP to determine if the UL PPDU is an intra-BSS or inter-BS PPDU. Alternatively, the AP may process a TA field in the MAC header of the MPDU of the PPDU and compare the TA value with the MAC addresses of its associated stations to determine if the UL PPDU is an intra-BSS or inter-BSS PPDU. If the UL PPDU is an intra-BSS PPDU, the AP may further determine if the transmitting station has received the announcement of the new BSS Color value by observing the BSS Color value included in the BSS Color subfield in the PHY header of the UL PPDU, as described previously.

The AP may intentionally poll a station to check if it has received the announcement, for example, when there is a lack of UL transmission from the station. The station may respond by transmitting a message frame including a specific indication indicating whether it has received the announcement. Alternatively, the station may respond by simply using the latest BSS Color value as the station knows or stores to set the BSS Color subfield in the PHY header of the UL HE SU PPDU or HE Extended Range SU PPDU transmitted by the station. The transmitted BSS Color value indicates to the AP whether or not the station has received the new BSS Color value.

When the AP determines that all of its associated stations have received the announcement (e.g., have switched to the new BSS Color value on the UL HE SU PPDU or the HE Extended Range SU PPDUs), the AP may determine to end the transitory period. The AP may also determine to end the transitory period after a particular number of announcements have been made or after a time T has expired. The AP may indicate the end of the transitory period by starting to use the new non-transitory BSS Color value to set the BSS Color subfield in the PHY header of the HE PPDUs transmitted by the AP. The AP may also use Beacon and other management frames (such as CCN frames) to announce the end of the transitory period. Stations knowing the new BSS Color value (from the announcements received) know that the transitory period has ended when they see that the AP starts using the new non-transitory BSS Color value to set the BSS Color subfield in the PHY header of the HE PPDUs transmitted by the AP.

Figure 5:
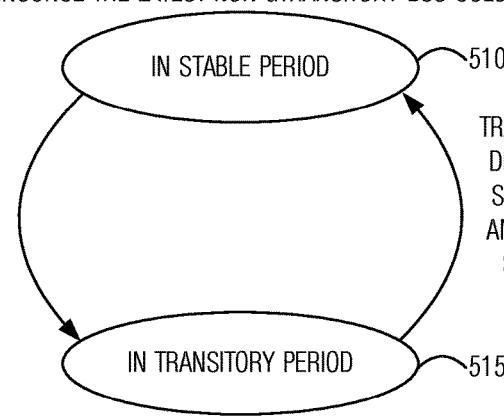
FIG. 5 illustrates an example state machine of an AP during operations when a BSS Color change occurs in the BSS served by the AP according to example embodiments described herein.

FIG. 5 illustrates an example state machine 500 of an AP during operations when a BSS Color change occurs in the BSS served by the AP. As shown in FIG. 5, state machine 500 has two states, state 510 and state 515. In state 510, the AP is in a stable period. In state 515, the AP is in a transitory period. Transition condition 520 indicates that the AP transitions from state 510 to state 515 when the AP determined there is a need to change the BSS Color value. Transition condition 525 indicates that the AP transitions from state 515 to state 510 when the AP determined that all its associated stations have received the announcement (e.g., have switched to the new non-transitory BSS Color value). Actions 530 list the actions taken by the AP while it is in state 510. Actions 535 list the actions taken by the AP while it is in state 515.

Figure 6A:
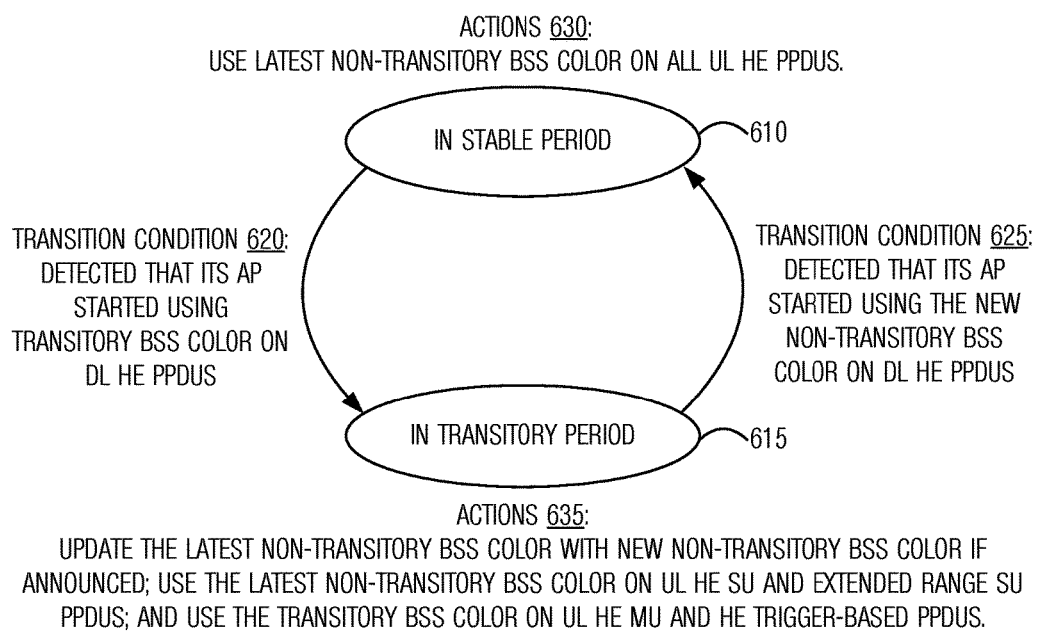
FIG. 6A illustrates a first example state machine of a station during operations when a BSS Color change occurs in the BSS that the station belongs to according to example embodiments described herein.

FIG. 6A illustrates a first example state machine 600 of a station during operations when a BSS Color change occurs in the BSS that the station belongs to. As shown in FIG. 6A, state machine 600 has two states, state 610 and state 615. In state 610, the station detects that the AP in a stable period. In state 615, the station detects that the AP is in a transitory period. Transition condition 620 indicates that the station transitions from state 610 to state 615 when the station detected that its associated AP has started using the Transitory BSS Color on DL HE PPDUs. Transition condition 625 indicates that the station transitions from state 615 to state 610 when the station detected that its associated AP has started using the new non-transitory BSS Color on DL HE PPDUs. Actions 630 list the actions taken by the station while it is in state 610. Actions 635 list the actions taken by the station while it is in state 615. In FIG. 6A, the actions 630 and actions 635 describe the actions taken by the station from a viewpoint of a net effect. The exact actions taken by the station may be different from what are shown in actions 630 or action 635 in FIG. 6A.

Figure 6B:
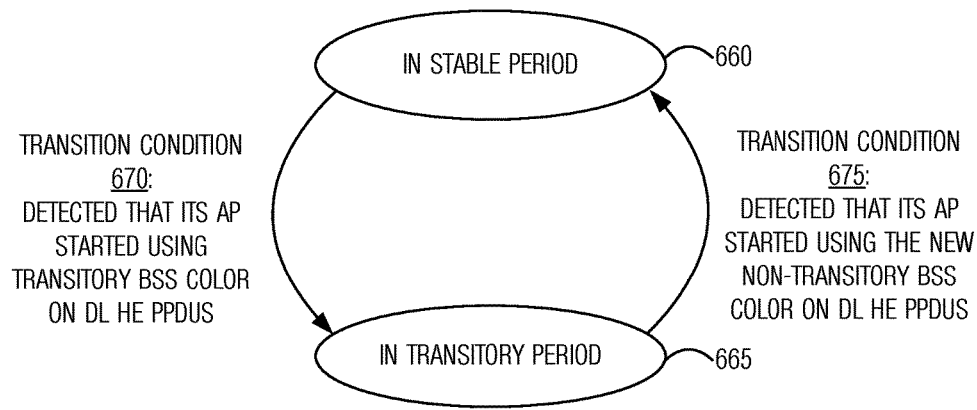
FIG. 6B illustrates a second example state machine of a station during operations when a BSS Color change occurs in the BSS that the station belongs to according to example embodiments described herein.

FIG. 6B illustrates a second example state machine 650 of a station during operations when a BSS Color change occurs in the BSS that the station belongs to. As shown in FIG. 6B, state machine 650 has two states, state 660 and state 665. In state 660, the station detects that the AP in a stable period. In state 665, the station detects that the AP is in a transitory period. Transition condition 670 indicates that the station transitions from state 660 to state 665 when the station detected that its associated AP has started using the Transitory BSS Color on DL HE PPDUs. Transition condition 675 indicates that the station transitions from state 665 to state 660 when the station detected that its associated AP has started using the new non-transitory BSS Color on DL HE PPDUs. Actions 680 list the actions taken by the station while it is in state 660. Actions 685 list the actions taken by the station while it is in state 665.

Because the AP uses the latest BSS Color value to set the BSS Color subfield in the PHY header of all the DL HE PPDUs transmitted by the AP during the stable period (as shown in actions 530 in FIG. 5, for example), the BSS Color value copied for the UL HE MU PPDUs and HE Trigger-based PPDUs by the station during the stable period (shown as the last action in actions 680 in FIG. 6b, for example) is the latest BSS Color value used by the AP.

Furthermore, because the AP keeps announcing the latest non-transitory BSS Color value, which remains unchanged during the stable period (as shown in actions 530 in FIG. 5, for example), no change occurs when the station repeatedly "update the latest non-transitory BSS Color value" with the same value. Therefore, the total net effect of actions 680 in FIG. 6B is same as actions 630 in FIG. 6A.

Because the AP uses the Transitory BSS Color value to set the BSS Color subfield in the PHY header of all the DL HE PPDUs transmitted by the AP during the transitory period (as shown in actions 535 in FIG. 5, for example), the BSS Color value copied for the UL HE MU PPDUs and HE Trigger-based PPDUs by the station during the transitory period (shown as the last action in actions 685 in FIG. 6B) is the Transitory BSS Color value. Therefore, the total net effect of actions 685 in FIG. 6B is same as actions 635 in FIG. 6A. Therefore, state machine 600 and state machine 650 essentially have the same net effect. But in FIG. 6B, the actions 680 and actions 685 are the same, which may significantly simplify the design and implementation of the stations practicing the arts and techniques taught in this disclosure.

Although changing a BSS Color may be an effective way of avoiding a collision among the BSS Color values used by stationary APs, a moving AP, such as a smartphone-turned soft AP, may temporarily cause BSS Color collisions with the stationary APs along the path taken by the moving AP, causing unnecessary disturbance to the (otherwise relatively stable) BSS Color configuration of the BSSs along the path. Therefore, it is highly recommended that the BSSs served by moving APs, such as the Wi-Fi modules in smartphones, should use another pre-specified BSS Color value (referred to as Null BSS Color value hereafter), such as BSS Color value "0" (i.e., value zero or binary value "000000"), indicating that those BSSs do not have a BSS Color. Another example value of Null BSS Color value may be decimal value "63" (or binary value "111111", if the Transitory BSS Color value is value "0"). Therefore, stations within a BSS that uses the Null BSS Color value (such as value "0") essentially give up the potential benefit of intra-PPDU power save, as described before, because they cannot determine that a received HE PPDU is an intra-BSS PPDU solely based on the Null BSS Color in the PHY header. The Null BSS Color value may also be referred to as the No BSS Color value.

Neither the Transitory BSS Color value nor the Null BSS Color value identifies the BSS from which a received PPDU originates. However, in an advanced implementation, a station associated with an AP with a non-null non-transitory BSS Color value (e.g., a value between 1 and 62 if the Null BSS Color value is "0" and the Transitory BSS Color value is "63") may treat a received HE PPDU with the Null BSS Color value (such as value "0") in the PHY header as an inter-BSS PPDU and potentially be able to spatially reuse the channel for transmitting data during the remainder of the HE PPDU, if other conditions are also met, such as a received power level (e.g., as measured during the PHY header) of the received HE PPDU is below the idle threshold (e.g., the OBSS_PD level). Similarly, a station associated with an AP with the Null BSS Color value may treat a received HE PPDU with a non-null non-transitory BSS Color in the PHY header as an inter-BSS PPDU and potentially be able to spatially reuse the channel for transmitting data during the reminder of the HE PPDU.

The pre-specified Transitory BSS Color value (such as decimal value "63" or binary value "111111") differs from the pre-specified Null BSS Color value (such as value "0" or binary value "000000") in that the Transitory BSS Color value indicates the AP had a BSS Color value but is in the process of changing it, so that the stations need to further use the MAC address in the TA or RA field in the MAC header of the MPDU to determine if a received HE PPDU is an inter-BSS or intra-BSS PPDU. The Transitory BSS Color value may be used to change a BSS Color value from the Null BSS Color value (such as "0") to a non-null non-transitory BSS Color value, or from a non-null non-transitory BSS Color value to the Null BSS Color value (such as "0"). For example, when a user with a smartphone travels, a Wi-Fi module on the smartphone may operate as a soft AP to serve a BSS, which may comprise the soft AP on the smartphone and one or more wearable devices worn by the user. As previously recommended, when the user (thus the soft AP) is moving, the soft AP should set the BSS Color value of the BSS that the soft AP serves to the Null BSS Color value (such as "0").

However, when the user comes home or arrives at work, the smartphone no longer continues to travel across other BSSs served by stationary APs, thereafter the soft AP on the smartphone may select a non-null non-transitory value as the new BSS Color value of the BSS served by the soft AP. Therefore, the soft AP on the smartphone may initiate a BSS Color Change procedure to change the BSS Color value of the BSS from the Null BSS Color value (such as value "0") to the selected non-null non-transitory BSS Color value through a transitory period and with the Transitory BSS Color value, as described previously. Having the BSS switch to the non-null non-transitory BSS Color value can help the wearable devices served by the soft AP to perform intra-PPDU power save in order to prolong the battery life, when the user is no longer in motion. When the user travels outside the home or office again, the soft AP on the smartphone may initiate another BSS Color Change procedure to change the BSS Color value of the BSS back to the Null BSS Color value (such as value "0") through another transitory period and with the Transitory BSS Color value, to avoid disturbing the stationary BSSs encountered as the user moves. The use of "home" is merely an example of where an AP may decide to switch between the Null BSS Color value and a non-null non-transitory BSS Color value. Other examples may include offices, schools, libraries, etc. A geo-location service on the smartphone, such as one based on GPS, cellular, Wi-Fi, and/or Bluetooth may provide determination of whether the smartphone is moving, has arrived at a location, or has departed from a location. A sensor, such as a speedometer or an accelerometer, on the smartphone may also provide determination of whether the smartphone is moving.

According to an example embodiment, an AP should not use the Transitory BSS Color value to set the BSS Color subfield in the HE-SIG-A field of its DL HE PPDUs nor be in the Transitory Period permanently or for an excessive period. According to an example embodiment, an AP shall not announce the Transitory BSS Color value as the new BSS Color value of the BSS served by the AP in the Beacon or other management frames such as CCN frames transmitted by the AP. If an AP cannot find a non-null non-transitory BSS Color value that is not being used by its OBSSs, the AP should select the Null BSS Color value (such as value "0") for the BSS that the AP serves, and, if necessary, initiate a BSS Color Change procedure to change the BSS Color of the BSS that the AP serves to the Null BSS Color value (such as value "0"). According to yet another example embodiment, the pre-specified Transitory BSS Color value and the Null BSS Color value may be the same value, e.g., value "0" or "63". However, if a station, which is served by an AP with a non-null BSS Color value, is surrounded by many moving APs, which use the Null BSS Color value as recommended earlier, the station will have to further process the MPDU of every PPDU with the BSS Color value "0" in the PHY header, because the STA can't tell, solely from the BSS Color value in the PHY header, whether the PPDU comes from its AP who has entered a transitory period or from a moving AP. Therefore, it is a preferred mode that the Transitory BSS Color value and the Null BSS Color value are pre-specified as two distinct values, e.g., through standardization.

Figure 7:
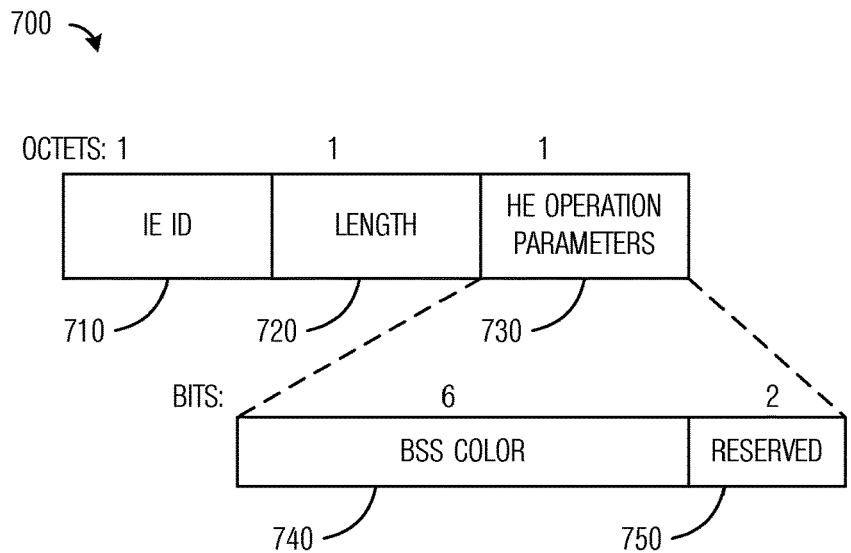
FIG. 7 illustrates an example format of an HE Operation element that may be used for announcing or indicating the non-transitory BSS Color value of a BSS according to example embodiments described herein.

FIG. 7 illustrates an example format of an HE Operation element 700 that may be used for announcing or indicating the non-transitory BSS Color value of a BSS. An HE Operation element (such as HE Operation element 700) may be included in Beacon frames (such as BCNs 440, 445, 450, 455, 460, and 465 in FIG. 4) and/or Color Change Notification (CCN) frames (such as CCNs 470, 475, and 480 in FIG. 4) to announce the BSS Color value currently being used by the BSS or the new BSS Color value to be used. If the HE Operation element is transmitted during a stable period, the non-transitory BSS Color value included in the HE Operation element is the non-transitory BSS Color value currently being used by the BSS. If the HE Operation element is transmitted during a transitory period, the non-transitory BSS Color value included in the HE Operation element is the new non-transitory BSS Color value, which is to be used by the AP on DL HE PPDUs after the transitory period ends, to be used by stations on the UL HE SU PPDUs and HE Extended Range SU PPDUs as soon as they receive the value, and to be used by stations on the UL HE MU PPDUs and HE Trigger-based PPDUs after the transitory period ends, as previously described. As shown in FIG. 7, HE Operation element 700 comprises an information element (IE) identifier (ID) field 710 containing a value indicating the element is an HE Operation element, a Length field 720 indicating a total length of remaining field(s) (not including Length field 720) in HE Operation element 700, and an HE Operation Parameters field 730 comprising a 6-bit BSS Color subfield 740 and a 2-bit Reserved subfield 750. BSS Color subfield 740 contains the non-transitory BSS Color value.

As described before, a station that has not received the announcement of the new BSS Color value, after observing that its AP has entered a transitory period for a while, may send a BSS Color Request action frame to query the latest BSS Color value. The IEEE 802.11 Standard has defined a generic frame format for all kinds of action frames with an Action field (in each of these action frames) that is specific for individual action frames.

Figure 8:
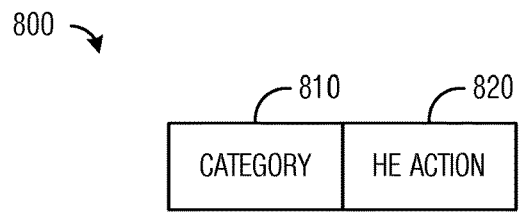
FIG. 8 illustrates an example format of an Action field in a BSS Color Request action frame according to example embodiments described herein.

FIG. 8 illustrates an example format of an Action field 800 in a BSS Color Request action frame. As shown in FIG. 8, Action field 800 comprises a Category field 810 containing a value indication the action frame is an HE action frame, and an HE Action field 820 containing a value indication the HE action frame is a BSS Color Request action frame requesting the latest non-transitory BSS Color of the BSS.

An AP receiving a BSS Color Request action frame from a station may respond with a CCN action frame. The AP may unicast the CCN action frame to the requesting station. Alternatively, the AP may broadcast the CCN action frame to all stations. Yet alternatively, if a target Beacon transmission time is near (i.e., with a time threshold) when the AP receives the BSS Color Request action frame, the AP may respond to the requesting station by broadcasting a Beacon frame with an HE Operation element (such as HE Operation element 700) including the latest non-transitory BSS Color of the BSS.

Figure 9:
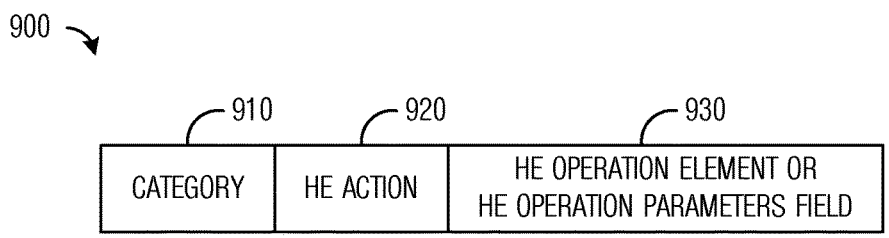
FIG. 9 illustrates an example format of an Action field in a CCN action frame according to example embodiments described herein.

FIG. 9 illustrates an example format of an Action field 900 in a CCN action frame. As shown in FIG. 9, Action field 900 comprises a Category field 910 containing a value indication the action frame is an HE action frame, an HE Action field 920 containing a value indication the HE action frame is a CCN action frame, and a field 930. Field 930 may contain an HE Operation element (such as HE Operation element 700 shown in FIG. 7). Alternatively, field 930 may simply contain an HE Operation Parameters field (such as HE Operation Parameters field 730 shown in FIG. 7) to avoid including the IE ID field (such as IE ID field 710) and the Length field (such as Length field 720), which are not necessary in a CCN action frame.

In an alternative embodiment, both Action fields in the BSS Color Request action frame and the CCN action frames have a field format that is similar to that of Action field 900, i.e., including a Category field (such as field 910), an HE Action field (such as field 920), and an HE Operation element field (such as field 930), wherein a value in the HE Action field indicates the action frame is a BSS Color Request action frame or CCN action frame, wherein the HE Operation element field contains an HE Operation element (such as HE Operation element 700 shown in FIG. 7) except that the HE Operation Parameters field (such as HE Operation Parameters field 730 shown in FIG. 7) is optionally present in the HE Operation element, i.e., the HE Operation Parameters field (such as HE Operation Parameters field 730) is present if the HE Operation element (such as HE Operation element 700) is included in a CCN frame but isn't present if the HE Operation element (such as HE Operation element 700) is included in a BSS Color Request frame.

In another alternative embodiment, the functions of both BSS Color Request and Color Change Notification are carried out by a single BSS Color action frame with an Action field with a similar format as Action field 900, i.e., including a Category field (such as field 910), an HE Action field (such as field 920), and an HE Operation element field (such as field 930), wherein a value in the HE Action field indicates the action frame is a BSS Color action frame, wherein the HE Operation element field contains an HE Operation element (such as HE Operation element 700 in FIG. 7) except that if a Length field (such as Length field 720 in FIG. 7) in the HE Operation element indicates that the HE Operation Parameters field (such as HE Operation Parameters field 730) is not present, the BSS Color action frame serves as a request of the latest BSS Color value of the BSS. On the other hand, if the Length field in the HE Operation element indicates that the HE Operation Parameter field is present, the BSS Color action frame serves as an announcement or a response to a request and carries the non-transitory BSS Color value of the BSS in a BSS Color subfield in the HE Operation Parameters field.

Figure 10:
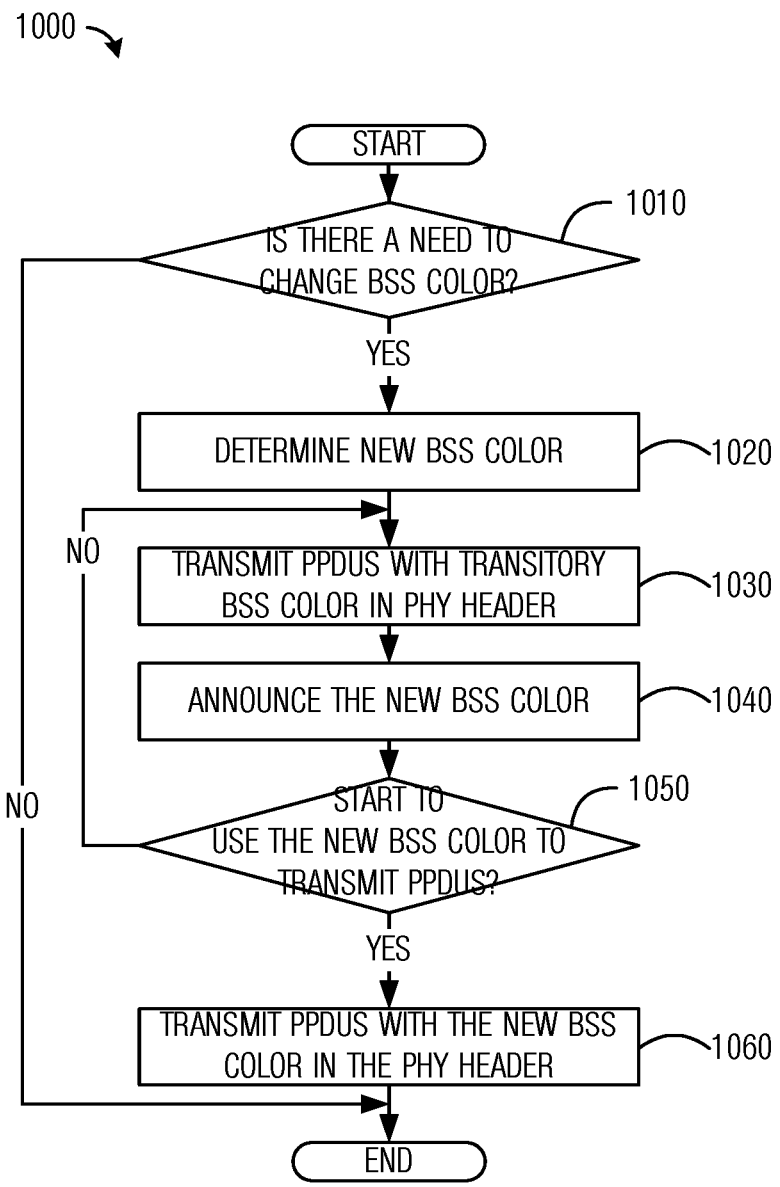
FIG. 10 illustrates a flow diagram of example operations occurring in an AP as the AP changes a BSS Color of a BSS served by the AP according to example embodiments described herein.

FIG. 10 illustrates a flow diagram of example operations 1000 occurring in an AP as the AP changes a BSS Color of a BSS served by the AP. Operations 1000 may be indicative of operations occurring in an AP while the AP changes the BSS Color of the BSS served by the AP.

Operations 1000 begin with the AP determining if there is a need to change the current BSS Color value used in the BSS served by the AP (block 1010). The AP may determine to change the current BSS Color value due to detecting a collision with the current BSS Color value, an arrival of the AP at a location (such as a home or office), a departure of the AP from a location (such as a home or office), a beginning of a motion, a stop of a motion, etc. If the AP determines there is no need to change the current BSS Color value in block 1010, operations 1000 may terminate. If the AP determines there is a need to change the BSS Color value in block 1010, the AP determines a new BSS Color value to be used by the BSS (block 1020). The new BSS Color value is not a pre-specified Transitory BSS Color value (such as binary value "111111").

The AP starts to transmit its DL HE PPDUs with the pre-specified Transitory BSS Color (such as binary value "111111") in the BSS Color subfield in the HE-SIG-A field in the PHY header of the DL HE PPDUs (block 1030). The AP announces the new BSS Color value as determined in block 1020 (block 1040). The AP may announce the new BSS Color value to stations within the BSS by transmitting Beacon or other management frames such as CCN frames. Then, the AP determines if it should start to use the new BSS Color value to set the BSS Color subfield in the HE-SIG-A field in the PHY header of the DL HE PDDUs transmitted by the AP (block 1050). The AP may determine if it should start to use the new BSS Color value on DL HE PPDUs based on a determination of whether all the stations associated with the AP have received the new BSS Color value, whether a specific number of announcements of the new BSS Color value have been made, whether a specific time has expired, and so on. If the AP determines that it shouldn't start to use the new BSS Color value on DL HE PPDUs in block 1050, the AP continues with the operations in blocks 1030 and 1040 until the AP determines that it should start to use the new BSS Color value on DL HE PPDUs in block 1050. If the AP determines that it should start to use the new BSS Color value on DL HE PPDUs in block 1050, the AP starts to transmit its DL HE PPDUs with the new BSS Color value in the BSS Color subfield in the HE-SIG-A field in the PHY header of the DL HE PPDUs (block 1060). Then, operations 1000 may terminate.

Figure 11:
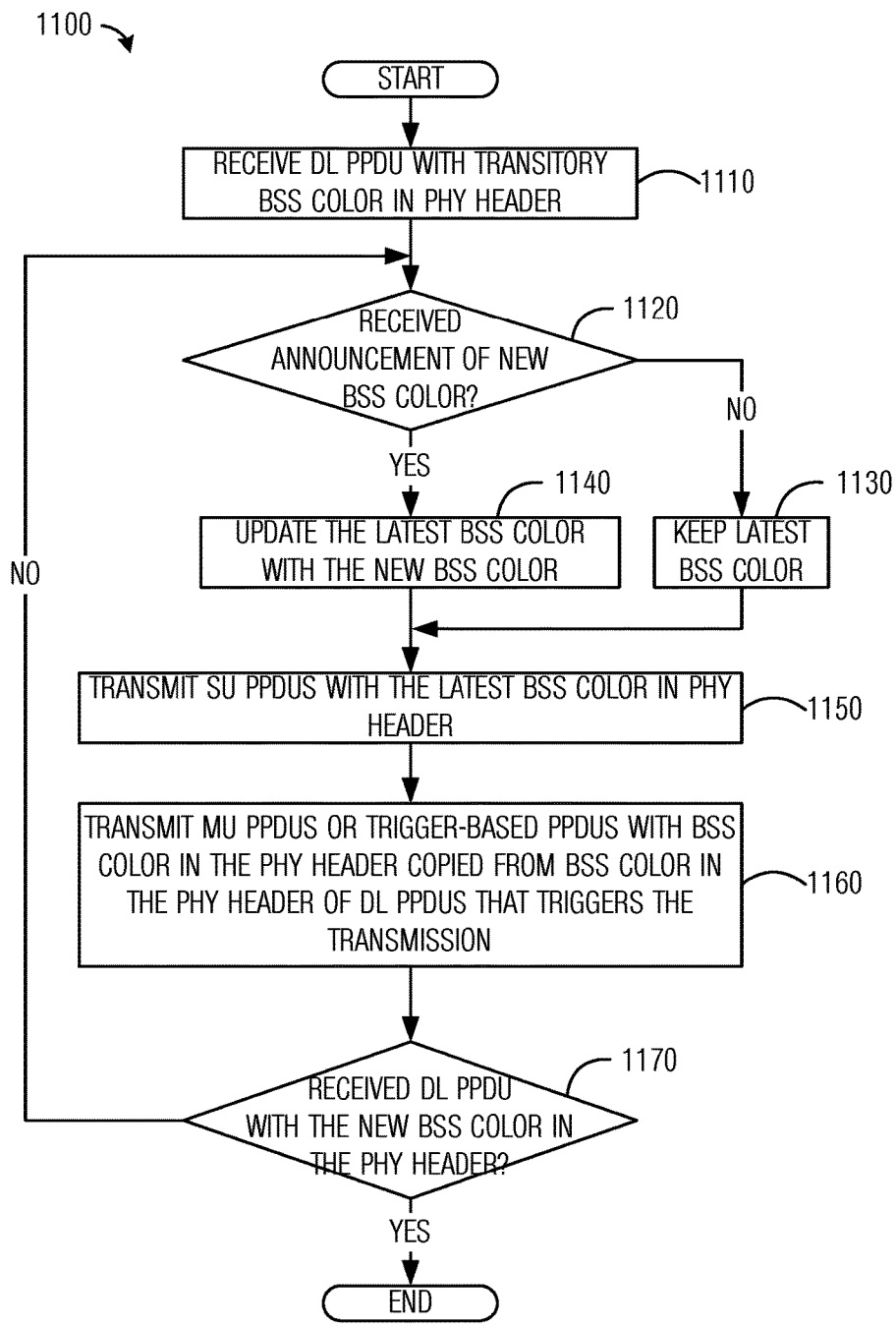
FIG. 11 illustrates a flow diagram of example operations occurring in a station as a BSS Color of a BSS that the station belongs to is being changed according to example embodiments described herein.

FIG. 11 illustrates a flow diagram of example operations 1100 occurring in a station as a BSS Color of a BSS that the station belongs to is being changed. Operations 1100 may be indicative of operations occurring in a station while the BSS Color of the BSS that the station belongs to is being changed.

Operations 1100 begin with the station receiving a HE PPDU from its associated AP with the BSS Color subfield in the HE-SIG-A field in the PHY header of the received PPDU set to the pre-specific Transitory BSS Color value (such as binary value "111111") (block 1110). The station notes the use of the Transitory BSS Color value in the PHY header as an indication that its AP has entered a transitory period for changing the BSS Color of the BSS. The station determines if it has received an announcement of a new non-transitory BSS Color value from its AP (block 1120). The announcement may be carried in Beacon or other management frames such as CCN frames. If the station determines that it hasn't received the announcement of the new non-transitory BSS Color value from its AP in block 1120, the station keeps the latest BSS Color value that the station knows or stores (block 1130). If the station determines that it has received the announcement of the new non-transitory BSS Color value from its AP in block 1120, the station updates (its knowledge or storage of) the latest BSS Color value with the new BSS Color value received (block 1140). The station transmits one or more HE SU PPDUs or HE Extended Range SU PPDUs with the BSS Color subfield in the HE-SIG-A field in the PHY header of the PPDUs set to the latest BSS Color value as the station knows or stores (block 1150). The station may transmit zero or more HE MU PPDUs or HE Trigger-based PPDUs with the BSS Color subfield in the HE-SIG-A field in the PHY header of the PPDUs set to a BSS Color value copied from the PHY headers of the DL PPDUs that trigger the UL transmissions by the station (block 1160). Such a DL PPDU may be a Trigger frame that triggers the HE Triggered-based PPDU being transmitted or a DL data frame that piggy-backs the scheduling information of the UL transmission of the HE MU PPDU being transmitted. Then, the station determines if it has received DL HE PPDUs from its AP with the BSS Color subfield in the HE-SIG-A field in the PHY header of the received PPDU set to the new non-transitory BSS Color value (block 1170). If yes, operations 1100 may terminate. If no, the station may go back to determine if it has received the new non-transitory BSS Color value in block 1120.

Figure 12:
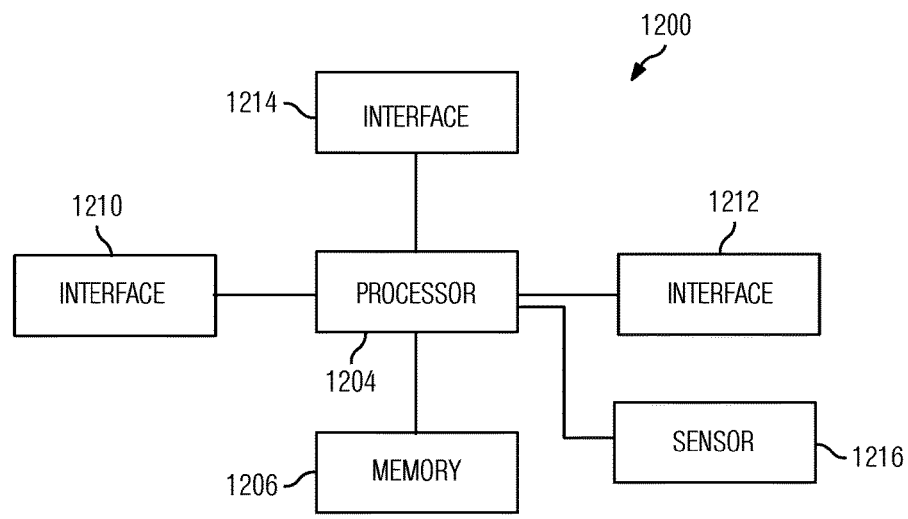
FIG. 12 illustrates a block diagram of an embodiment processing system for performing methods described herein.

FIG. 12 illustrates a block diagram of an embodiment processing system 1200 for performing methods described herein, which may be installed in a host device. As shown, the processing system 1200 includes a processor 1204, a memory 1206, and interfaces 1210-1214, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204 and to store values such as a BSS Color value of a BSS. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in FIG. 12, such as long term storage (e.g., non-volatile memory, etc.).

Processing system also includes a sensor 1216 that provides geo-location information about processing system 1200. As an example, the geo-location information includes information such as positional information, mobility information, arrival information, departure information, and so on, of processing system 1200, which is usable by processing system 1200 in the determining to change the BSS Color. Alternatively, one or more of the interfaces 1210, 1212, 1214 may be with a global positioning system (GPS) receiver, an interfaces to wireless transmitters such as cellular base stations, Wi-Fi access points, Bluetooth beaconing devices, and so forth. Sensor 1216 and the interfaces may provide information to processing system 1200 usable in determining a location and/or a mobility status of processing system 1200, which is potentially useful in determining to change the BSS Color.

In some embodiments, the processing system 1200 is included in a network device that is accessing, or part otherwise of, a telecommunications network. In one example, the processing system 1200 is in a network-side device in a wireless telecommunications network, such as a base station, a relay station, a scheduler, a controller, a gateway, a router, an applications server, or any other device in the telecommunications network. In other embodiments, the processing system 1200 is in a user-side device accessing a wireless telecommunications network, such as a mobile station, a user equipment (UE), a personal computer (PC), a tablet, a wearable communications device (e.g., a smartwatch, etc.), or any other device adapted to access a telecommunications network.

Figure 13:
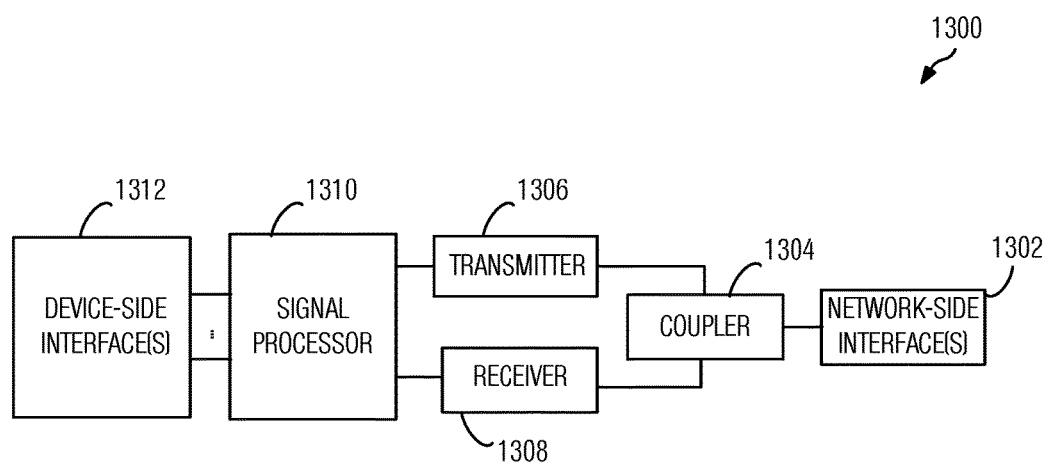
FIG. 13 illustrates a block diagram of a transceiver adapted to transmit and receive signaling over a telecommunications network according to example embodiments described herein.

In some embodiments, one or more of the interfaces 1210, 1212, 1214 connects the processing system 1200 to a transceiver adapted to transmit and receive signaling over the telecommunications network. FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for changing an identifier of a basic service set (BSS) served by an access point (AP), the method comprising:
   transmitting, by the AP, a first physical (PHY) protocol data unit (PPDU) with a first BSS identifier field in a PHY header of the first PPDU set to a first non-transitory value;
   in response to determining a need for replacing the first non-transitory value with a second non-transitory value:
      transmitting, by the AP, at least one second PPDU with the first BSS identifier field in the PHY header of the at least one second PPDU set to a pre-specified transitory value known to all stations associated with the AP, each of the first non-transitory value, the second non-transitory value and the pre-specified transitory value being different from each other; and
      transmitting, by the AP, at least one first management frame including a second BSS identifier field in a frame body of the at least one first management frame set to the second non-transitory value; and
   transmitting, by the AP, at least one third PPDU with the first BSS identifier field in the PHY header of the at least one third PPDU set to the second non-transitory value.

2. The method of claim 1, wherein the at least one third PPDU is transmitted in response to the AP determining that the transmission of the at least one first management frame is sufficient to start using the second non-transitory value to set the first BSS identifier field in the PHY header of PPDUs transmitted by the AP.

3. The method of claim 1, further comprising detecting, by the AP, one of a collision with the first non-transitory value of the identifier of the BSS, an arrival of the AP at a location, or a departure of the access point from the location, prior to transmitting the at least one second PPDU.

4. The method of claim 1, wherein the identifier of the BSS is a BSS Color, wherein the pre-specified transitory value indicates a pending change to a value of the BSS Color, wherein the pre-specified transitory value is one of value 63 or value zero, wherein the first BSS identifier field is a BSS Color subfield in a High Efficiency Signal A (HE-SIG-A) field, and wherein the second BSS identifier field is a BSS Color subfield in one of a HE Operation element or an Action field.

5. The method of claim 1, wherein the AP begins transmitting the at least one third PPDU in response to at least one of the all stations associated with the AP having received the second non-transitory value, a specified number of first management frames having been transmitted, or a specified time having elapsed since transmitting the at least one second PPDU.

6. The method of claim 5, wherein the all stations associated with the AP has received the second non-transitory value occurs in response to one or more PPDUs including a PHY header with the first BSS identifier field in the PHY header of the one or more PPDUs set to the second non-transitory value having been received from each of the all stations associated with the AP.

7. The method of claim 1, further comprising:
   transmitting, by the AP, a polling message to a first station associated with the AP, wherein the AP has not received any PPDU including a PHY header with the first BSS identifier field in the PHY header set to the second non-transitory value from first station;
   receiving, by the AP, a new PPDU from the first station; and
   determining, by the AP, if the first station has received the second non-transitory value in accordance with the new PPDU received from the first station.

8. The method of claim 1, further comprising:
   receiving, by the AP, a query frame including a request for the identifier of the BSS; and
   transmitting, by the AP, a second management frame including a fourth BSS identifier field in the frame body of the second management frame set to the second non-transitory value.

9. A method for changing an identifier of a basic service set (BSS) including a station, the method comprises:
   receiving, by the station, a first physical (PHY) protocol data unit (PPDU) with a first BSS identifier field in a PHY header of the first PPDU set to a first non-transitory value;
   receiving, by the station, a second PPDU from an access point (AP) serving the BSS, the second PPDU including the PHY header with the first BSS identifier field set to a pre-specified transitory value known to all stations associated with the AP;
   receiving, by the station, a management frame from the AP, the management frame including a second BSS identifier field in a frame body of the management frame, the second BSS identifier field set to a second non-transitory value of the identifier of the BSS, each of the first non-transitory value, the second non-transitory value and the pre-specified transitory value being different from each other; and
   transmitting, by the station to the AP after receiving the management frame, a third PPDU with the first BSS identifier field in the PHY header of the third PPDU set to the second non-transitory value.

10. The method of claim 9, wherein the identifier of the BSS is a BSS Color, wherein the pre-specified transitory value indicates a pending change in a value of the BSS Color, and wherein the pre-specified transitory value is one of value 63 or value zero.

11. The method of claim 9, further comprising transmitting, by the station, a query frame including a request for the identifier of the BSS prior to receiving the management frame.

12. The method of claim 9, further comprising receiving, by the station, a polling message prior to transmitting the third PPDU.

13. The method of claim 9, wherein the third PPDU is in one of a high efficiency (HE) single user (SU) PPDU format or an HE extended range SU PPDU format.

14. The method of claim 9, further comprising:
receiving, by the station, a fourth PPDU from the AP, the fourth PPDU including scheduling information for the station to transmit on an uplink channel and a third BSS identifier field; and
transmitting, by the station, a fifth PPDU including the first BSS identifier field in the PHY header of the fifth PPDU set to a value of the third BSS identifier field of the fourth PPDU, wherein the fifth PPDU is transmitted using one of an HE multiple user (MU) PPDU format or an HE Trigger-based PPDU format.

15. The method of claim 9, further comprising receiving, by the station after receiving the management frame and prior to transmitting the third PPDU, a sixth PPDU with the first BSS identifier field in the PHY header of the sixth PPDU set to the second non-transitory value, the third PPDU being transmitted using one of a high efficiency (HE) multi-user (MU) PPDU format or an HE trigger-based PPDU format.

16. An access point (AP) adapted to change an identifier of a basic service set (BSS) served by the AP, the AP comprising:
a non-transitory memory storage comprising instructions; and
a processor in communication with the memory storage, wherein the processor executes the instructions to:
transmit a first physical (PHY) protocol data unit (PPDU) with a first BSS identifier field in a PHY header of the first PPDU set to a first non-transitory value;
in response to determining a need for replacing the first non-transitory value with a second non-transitory value:
transmit at least one second PPDU with the first BSS identifier field in the PHY header of the at least one second PPDU set to a pre-specified transitory value known to all stations associated with the AP, wherein each of the first non-transitory value, the second non-transitory value and the pre-specified transitory value are different from each other, and
transmit at least one first management frame including a second BSS identifier field in a frame body of the at least one first management frame set to the second non-transitory value; and
transmit at least one third PPDU with the first BSS identifier field in the PHY header of the at least one third PPDU set to the second non-transitory value.

17. The AP of claim 16, wherein the processor executes the instructions to detect one of a collision with the first non-transitory value of the identifier of the BSS, an arrival of the AP at a location, or a departure of the access point from the location, prior to the processor executing the instructions to transmit the at least one second PPDU.

18. The AP of claim 16, wherein the processor executes the instructions to transmit a polling message to a first station associated with the AP, wherein the AP has not received any PPDU including a PHY header with the first BSS identifier field in the PHY header set to the second non-transitory value from first station, receive a new PPDU from the first station, and determine if the first station has received the second non-transitory value in accordance with the new PPDU received from the first station.

19. The AP of claim 16, wherein the processor executes the instructions to receive a query frame including a request for the identifier of the BSS, and transmit a second management frame including a fourth BSS identifier field in the frame body of the second management frame set to the second non-transitory value.

20. A station adapted to change an identifier of a basic service set (BSS) including the station, the station comprising:
a non-transitory memory storage comprising instructions; and
a processor in communication with the memory storage, wherein the processor executes the instructions to:
receive a first physical (PHY) protocol data unit (PPDU) with a first BSS identifier field in a PHY header of the first PPDU set to a first non-transitory value,
receive a second PPDU from an access point (AP) serving the BSS, the second PPDU including the PHY header with the first BSS identifier field set to a pre-specified transitory value known to all stations associated with the AP,
receive a management frame from the AP, the management frame including a second BSS identifier field in a frame body of the management frame, the second BSS identifier field set to a second non-transitory value of the identifier of the BSS, wherein each of the first non-transitory value, the second non-transitory value and the pre-specified transitory value are different from each other, and
transmit, to the AP after receiving the management frame, a third PPDU with the first BSS identifier field in the PHY header of the third PPDU set to the second non-transitory value.

21. The station of claim 20, wherein the processor executes the instructions to transmit a query frame including a request for the identifier of the BSS prior to receiving the management frame.

22. The station of claim 20, wherein the processor executes the instructions to receive a polling message prior to transmitting the third PPDU.

23. The station of claim 20, wherein the processor executes the instructions to:
receive a fourth PPDU from the AP, the fourth PPDU including scheduling information for the station to transmit on an uplink channel and a third BSS identifier field, and
transmit a fifth PPDU including the first BSS identifier field in the PHY header of the fifth PPDU set to a value of the third BSS identifier field of the fourth PPDU, wherein the fifth PPDU is transmitted using one of an HE multiple user (MU) PPDU format or an HE Trigger-based PPDU format.

24. The station of claim 20, wherein the processor executes the instructions to receive, after receiving the management frame and prior to transmitting the third PPDU, a sixth PPDU with the first BSS identifier field in the PHY header of the sixth PPDU set to the second non-transitory value, wherein the third PPDU is transmitted using one of a high efficiency (HE) multi-user (MU) PPDU format or an HE trigger-based PPDU format.

* * * * *